United States Patent [19]

Boyce et al.

[11] Patent Number: 4,510,573

[45] Date of Patent: Apr. 9, 1985

[54] METHOD FOR X-RAY FLUORESCENCE SPECTROSCOPY

[75] Inventors: William C. Boyce; Warren D. Wittekind, both of Richland; Leroy C. Howard, West Richland; Thomas E. Hall, Richland; Wayne M. Lechelt, Benton City, all of Wash.

[73] Assignee: UNC Nuclear Industries, Inc., Richland, Wash.

[21] Appl. No.: 260,984

[22] Filed: May 6, 1981

[51] Int. Cl.³ .................... G06F 15/46; G01N 23/00
[52] U.S. Cl. .................................. 364/498; 250/253; 378/48
[58] Field of Search ............... 364/422, 527, 498; 378/45, 48, 49; 250/253

[56] References Cited

U.S. PATENT DOCUMENTS

| | | | |
|---|---|---|---|
| 3,703,726 | 11/1972 | Stephenson | 378/48 X |
| 4,016,419 | 4/1977 | Kotani et al. | 378/48 |
| 4,021,667 | 5/1977 | Clausen et al. | 378/45 |
| 4,031,367 | 6/1977 | Murphy | 250/253 X |
| 4,045,676 | 8/1977 | Rolle | 250/253 X |
| 4,066,892 | 1/1978 | Givens | 250/253 X |
| 4,349,736 | 9/1982 | Miller | 378/83 |
| 4,362,935 | 12/1982 | Clark | 378/48 |

OTHER PUBLICATIONS

Technical Instructions on Conducting Geophysical Testing in Boreholes, Gosgeotechizdat, Moscow, 1963, pp. 18-21, 56-59, 208.
Quantitative X-ray Fluorescence Analysis, N. F. Lossev, "Nauka", Publishers, Moscow, 1969, p. 131.

Primary Examiner—Edward J. Wise
Attorney, Agent, or Firm—Pennie & Edmonds

[57] ABSTRACT

A method and apparatus are described for performing X-ray fluorescence analysis where the physical relationship between the source/detector and the object being examined is not controlled. This technique and apparatus is particularly advantageous in performing an in situ analysis of the concentration of one or more elements present in a matrix of a material such as rock. In accordance with this aspect of our invention, such a mineral assay is performed by drilling a borehole into the matrix, inserting into the borehole a probe containing a suitable XRF source/detector, irradiating the matrix, detecting the spectrum of radiation that is produced and analyzing this spectrum. Preferably, the concentration of the assayed element is determined from the following formula:

$$\% \text{ conc.} = \left( \frac{S - K_1 \cdot B}{C - K_2 \cdot B} \right) \cdot (K_3 + K_4 \cdot E/C) + (K_5 + K_6 \cdot E/C)$$

where S is the number of photons counted having energies in a signal range where the X-ray spectral line of the assayed element is observed, C is the number of photons counted in a range where a radiation peak is observed, B is the number of photons counted in a background range, E is the number of photons counted in a range adjacent that where said radiation peak is observed, and $K_1$ through $K_6$ are empirically determined constants relating to the performance of the probe.

58 Claims, 19 Drawing Figures

METHOD FOR X-RAY FLUORESCENCE SPECTROSCOPY

BACKGROUND OF THE INVENTION

This relates to a method and apparatus for X-ray fluorescence (XRF) spectroscopy. The techniques and equipment described are particularly useful for a quantitative borehole analysis of the elemental content of surrounding rock. Numerous other applications will also be apparent.

Each chemical element has a distinctive X-ray line spectrum having energies and therefore wavelengths that are dependent only upon the atomic number Z of the element. As a result it is possible to identify the presence of the element from observation of one or more of its distinctive line spectra. These distinctive X-ray lines are produced when an electron from one of the outer shells of the atom takes the place of an electron that was previously removed from an inner shell. The K spectra arise from electron transitions from the L to K shell which give rise to the doublet $K\alpha_1$ and $K\alpha_2$ and M to K transitions which produce $K\beta_1$ and $K\beta_2$. The L spectra have a dozen or more lines of longer wavelengths produced by transitions from the M and upper shells to the L shell. The higher atomic number elements also have M and N spectra.

To remove an electron from an inner shell, it is necessary to bombard an atom with a high-energy electron beam or with a high energy beam of electromagnetic radiation such as X-rays or gamma rays. The energy required to cause such electron vacancy must exceed the binding energy of the electron in its shell.

In addition to the line spectrum, a continuous, nearly structureless, background spectrum of wavelengths is generated by such bombardment. When an X-ray tube is used to generate a stream of high energy bombardment electrons, this spectrum is produced by the rapid deceleration of electrons in the target of the X-ray tube. Where high energy electromagnetic radiation is used, the continous spectrum is generated by the collisions of photons of electromagnetic radiation with electrons in accordance with the well known Compton effect. Considerable additional information on XRF analysis may be found in R. O. Muller, *Spectrochemical Analysis by X-ray Fluorescence* (Plenum 1972).

The intensity of the radiation in any XRF spectral line is a measure of the concentration of the element which produced such spectral line. As a result, the techniques of XRF analysis are widely used for analyzing materials such as ores, soils, glasses, catalysts, alloys, clays, dusts, paints, silicates, and the like to determine their elemental composition and concentration. For example, the techniques can be used for trace analysis in a laboratory or for on-stream analysis of process streams.

One application of particular interest to the present invention is the use of XRF analysis in mineral assays. Until recently, such use of XRF analysis was limited to the laboratory. A sample ore to be examined was obtained from the mine, prepared for analysis in the form of a solution or fine powder and irradiated with a source of high energy electrons, X-rays or gamma rays under controlled laboratory conditions. The resulting X-ray spectrum was then measured over the wavelengths of interest to determine what minerals were present and in what concentration. Obviously, however, this process is time consuming and does not permit on-site assays.

In U.S. Pat. No. 4,045,676, which is incorporated herein by reference, a technique is described which permits the use of XRF analysis at the rough surface of a mine face. In this technique a reference sample is prepared having a known concentration of the element which is to be assayed. The reference sample is then irradiated by a suitable source and a broad spectrum of background radiation from the sample is measured by the detector. For the same geometrical relation of source, detector and sample, a measurement is also made of the intensity of X-ray radiation having the characteristic energies and therefore wavelengths of the element whose concentration is to be determined. To assay this element in the matrix of rock at the mine face, the mine face is irradiated by the same source and the distance between the source/detector arrangement and the mine face is changed until the intensity of background radiation measured by the detector is the same as that from the reference sample. A measurement is then made of the intensity of X-ray radiation having the characteristic energies of the element being assayed. From this measurement and from the previously established relation between spectral line intensity and background in the sample of known concentration, an estimate of the concentration of the element is made.

This technique, however, requires the use of at least one reference sample and the ability to control the physical relationship between the source/detector and the object to be examined. While such control may be possible in the laboratory or at a mine face, it cannot be used in numerous other applications where assays are desirable. In addition, calibration of such device is a time consuming task which must be performed manually during each assay.

SUMMARY OF THE INVENTION

We have devised a method and apparatus for performing X-ray fluorescence analysis where the physical shape of the object and the physical relationship between the source/detector and the object being examined are not controlled. This technique and apparatus eliminates the need to prepare samples as in laboratory analysis or to calibrate the device during or between assays as in the technique disclosed in the '676 patent. Its use is particularly advantageous in the field in performing an in situ analysis of the concentration of one or more elements present under the rough surface of a matrix of a material such as rock. In accordance with this aspect of our invention, such a mineral assay is performed by drilling a borehole into the matrix, inserting into the borehole a probe containing a suitable XRF source/detector, irradiating the matrix, detecting the spectrum of radiation that is produced and analyzing this spectrum.

Further in accordance with the preferred embodiment of our invention, the spectrum is analyzed by counting for a period of time the number of X-ray photons detected in at least four energy ranges: a Compton range where the Compton peak is observed, an edge range at the edge of the Compton peak, a signal range where the X-ray spectral line or signal of the assayed element is observed, and a background range where the radiation that is detected is almost exclusively radiation from the source that has leaked through the shielding. From these measurements the concentration of the assayed element is determined from the following formula:

$$\% \text{ conc.} = \left( \frac{S - K_1 \cdot B}{C - K_2 \cdot B} \right) \cdot (K_3 + K_4 \cdot E/C) + (K_5 + K_6 \cdot E/C)$$

where S is the number of photons counted having energies in the signal range, C is the number of photons counted in the Compton range, B is the number of photons counted in the background range, E is the number of photons counted in the edge range and $K_1$ through $K_6$ are empirically determined constants relating to the performance of the probe.

$K_1$ and $K_2$ are scaling factors which relate the number of counts measured in the background range of energies to the number of counts present in the signal and Compton ranges which are attributable to leakage of the source radiation through the shielding. These values depend on the particular geometry of the source and detector and the shielding between them as well as on the relative sizes of the signal, Compton and background ranges. They are determined from observed counts of X-ray photons in the signal, Compton and background ranges in the absence of the element being assayed.

The remaining constants provide a slope and an intercept which relate the percent concentration of the element being studied to the term $(S-K_1 \cdot B)/(C-K_2 \cdot B)$. The constants $K_3$ through $K_6$ are determined from a series of measurements of reference samples having known percent concentrations distributed throughout the range of concentrations over which the probe is to be used. For each such sample the probe is used to count the number of X-ray photons detected in the signal, Compton and background ranges. From these values, the quantity $(S-K_1 \cdot B)/(C-K_2 \cdot B)$ is calculated for each sample; and to these quantities a least squares fit of a straight line is made. The slope of this straight line is set equal to the term $K_3 + K_4 \cdot E/C$ and the intercept is set equal to the term $K_5 + K_6 \cdot E/C$.

A significant source of error in the detector is variations in its gain due to temperature changes, drift and the like. Such changes in gain cause the detector to misread the energies of the received X-ray radiation as amounts greater or less than the true value. We have found that the slope and intercept terms vary significantly as a function of the ratio E/C, which is a sensitive measure of how accurately the detector has related the observed counts to the correct energy range, and that variations in the slope and intercept terms with respect to observed values of E/C can be used to compensate for changes in gain.

To determine the variation of the slope and intercept terms with respect to E/C, a computer simulation is made of the effect of small shifts in the observed energy ranges on the values of the term $(S-K_1 \cdot B)/(C-K_2 \cdot B)$ for the measurements of the reference samples and on the slope and intercept of the least squares fit to these values. In particular, we calculate the value $(S-K_1 \cdot B)/(C-K_2 \cdot B)$ for each of the reference samples for each of five different shifts in the observed energy ranges. For each of these five shifts, a least squares fit of a straight line is made for the calculated values of $(S-K_1 \cdot B)/(C-K_2 \cdot B)$ and the slope and intercept of the line is determined.

The five values for the slope and the five values for the intercept are each functions of the ratio E/C. Within the normal range of gain errors that are likely to be experienced by the detector, there are only a single value of the slope and a single value of the intercept for each value of E/C. Hence, for an observed value of the ratio E/C it is possible to obtain by interpolation between the slope values a single value of a slope correction and by interpolation between the intercept values a single value of an intercept correction. For linear interpolation, the computer calculates the slopes $K_4$, $K_6$ and intercepts $K_3$, $K_5$ of straight lines between the five slope values and the five intercept values, respectively, and stores these values as functions of specified ranges of E/C. These values are then used in the calculation of percent concentration as described above.

In addition to borehole mineral assays, our invention may be used in other fields of mineral exploration such as mine face assays and ground surface assays. The invention may also be used for remote sensing in other environments such as oceanographic and extra-terrestrial exploration. The techniques of our invention may also be used to perform bulk assays of ore as, for example, in grading and/or sorting devices. Our invention may also be used to detect trace elements in process streams and to perform quality assurance and material analysis on all manner of industrial output. It can also be used to detect objects hidden in baggage or freight by using the invention to detect the presence of characteristic elements in such objects or characteristic concentrations of such elements. In medical applications, the invention may be used, for example, to monitor the movement of a chemical element through the body. In all these applications, usable results may be obtained with our invention without special preparation of the object subjected to X-ray fluorescence and without control of the geometrical relation between the source/detector and the object.

Different configurations of the apparatus are used for different applications. For borehole assays, the source and detector are combined in a probe which may be lowered or pushed into the borehole. Suitable electronics in the probe generate signals representative of the energy of the radiation received and transmit these signals to a data analyzer which processes the spectrum and calculates the percent concentration of the element or elements being assayed. Advantageously, the source is Cobalt [57] and the detector is a cadmium telluride wafer. The probe is a cylinder approximately 1¼ inches (32 mm.) in diameter and 33 inches (838 mm.) in length. The data analyzer is a small battery powered unit which is connected to the probe by a suitable cable. When used for surface assay applications, the source and detector advantageously are incorporated in a hand held pistol-like device. For medical applications, the source and detector advantageously are mounted on an articulated scanning head. One or more of these configurations will generally be suitable for the other applications described above.

BRIEF DESCRIPTION OF THE DRAWINGS

These and other objects, features and advantages of our invention are more fully described in the following detailed description of the best mode for carrying out the invention in which.

BEST MODE FOR CARRYING OUT THE INVENTION

Figure 1:
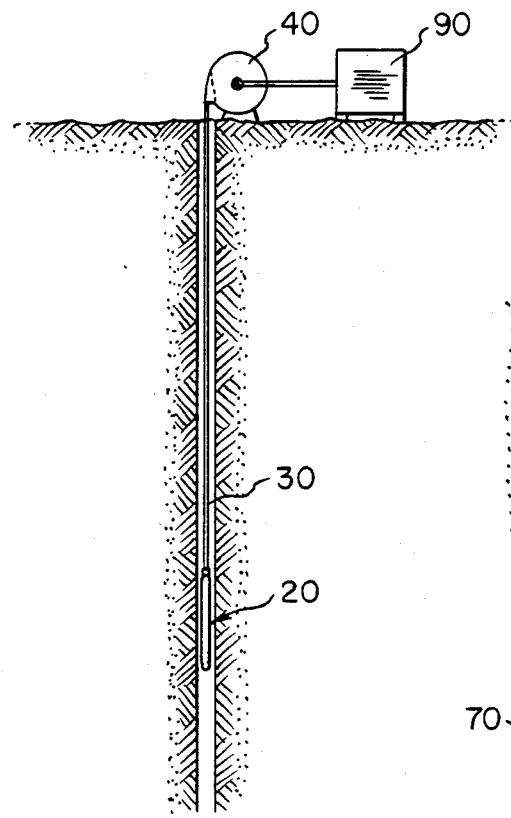
FIG. 1 is a schematic illustration depicting the use of our invention for performing an assay in a borehole.

FIG. 1 depicts the application of our invention to the performance of a borehole assay of at least one of the elements in the matrix surrounding the borehole. In accordance with our invention, a borehole is first drilled into the matrix whose chemical content is to be analyzed. Illustratively, this borehole may be as small as 1½ inches (38 mm.) in diameter and may be hundreds or even thousands of feet deep. In accordance with the invention a probe 20 connected to a cable 30 is lowered by a winch 40 into the borehole. As shown in the enlarged, cut-away view of FIG. 2, the probe contains a source 50 of high energy electromagnetic radiation, a detector 60 for X-ray fluorescence produced in said matrix when it is irradiated by said source and an electronic circuit 70. Advantageously, source 50 is Cobalt $^{57}$ and detector 60 is cadmium telluride. Circuit 70 processes the X-ray fluorescence signals received by said detector and transmits them by a signal cable 80 to an analyzer 90 that is located outside the borehole. Analyzer 90 illustratively is a microcomputer that processes the received signals to produce a quantitative estimate of the concentration of at least one element in the matrix surrounding the borehole.

In FIG. 1 the probe is shown being lowered into a vertically drilled borehole. The invention, however, may be practiced using boreholes drilled at any angle. Where the weight of the probe and/or the angle of the borehole is such that the probe cannot simply be lowered into the borehole, pushrods may be used to advance the probe.

Figure 2:
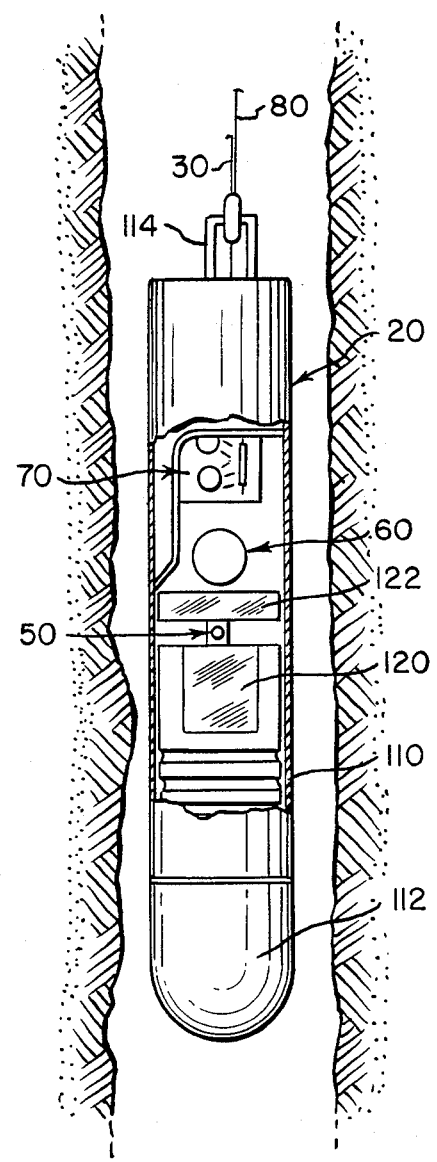
FIG. 2 is a cut-away view of an illustrative embodiment of a probe that is lowered into the borehole in accordance with our invention.

As shown in FIG. 2, probe 20 is a torpedo shaped device with a cylindrical stainless steel casing 110 having a rounded front end 112 and a rear mounting 114 for the cable which connects it to the winch. Illustratively, the probe has a diameter of about 1¼ inches (32 mm.) and a length of 33 inches (838 mm.). In addition to the source, detector and electronic circuit, the probe also contains forward and rear shields 120, 122 which shape the beam of radiation from source 50 with rear shield 122 also greatly reducing the amount of radiation from source 50 which is incident on detector 60.

Figure 3A:
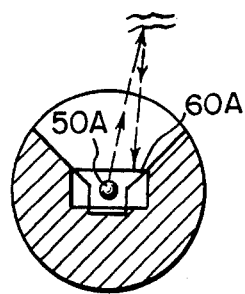
FIG. 3 is a schematic illustration of several alternative arrangements of a source and a detector in the probe of FIG. 2.
Figure 3D:
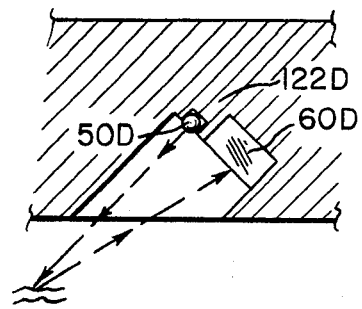
Figure 3B:
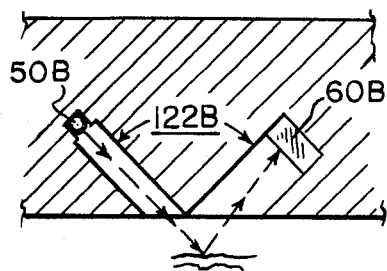
Figure 3E:
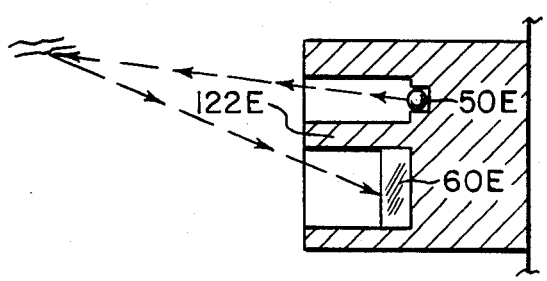
Figure 3C:
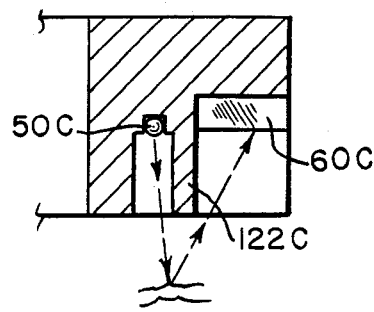
Figure 3F:
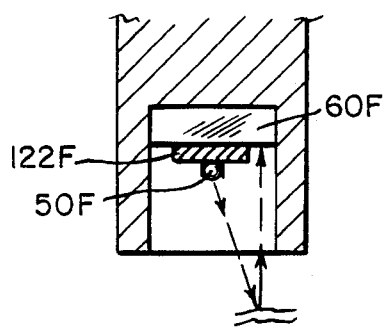

Several different geometries of source, detector and shielding may be used in practicing the invention. As shown in FIG. 2, source 50 and shields 120, 122 are arranged so that radiation emanates from the source in a disc-like pattern transverse to the longitudinal axis of the probe and encompassing the entire circumference of the probe. Illustratively, this radiation pattern is only ¼ inch (6 mm.) thick at the periphery of the probe. Detector 60 similarly receives X-ray fluorescence from the irradiated matrix over a full 360° of arc. As shown in FIG. 3A, the region irradiated by a source 50A can be limited by shielding to only a portion of a circle such as the 90° arc shown. The area seen by a detector 60A can be limited in similar fashion. Other side looking geometries that can be used include those of FIGS. 3B, 3C and 3D wherein sources 50B, 50C and 50D direct a narrow beam of radiation outward from one side of the probe at the adjacent matrix and detectors 60B, 60C and 60D sense the X-ray fluorescence produced thereby. As shown in FIG. 3B, the orientation of the source 50B and detector 50C are approximately at right angles to each other with shielding 122B in between. In FIGS. 3C and 3D, sources 50C, 50D and detectors 60C, 60D are oriented so that the direction of outward radiation is substantially anti-parallel to the direction of radiation received by the detector. In FIG. 3C the direction of outward radiation is substantially perpendicular to the longitudinal axis of the probe while in FIG. 3D it is at an acute angle thereto. End looking geometries are shown in FIGS. 3E and 3F. In FIG. 3E, source 50E and detector 60E are arranged so that the direction of outward radiation is substantially anti-parallel to that of the received radiation but the source and detector are located at different positions in the forward end of the probe separated by shielding 122E. In FIG. 3F, the source and the detector are concentric to one another with a shield 122F in between. As will be apparent, numerous other geometrical arrangements can be devised by those skilled in the art.

Figure 4:
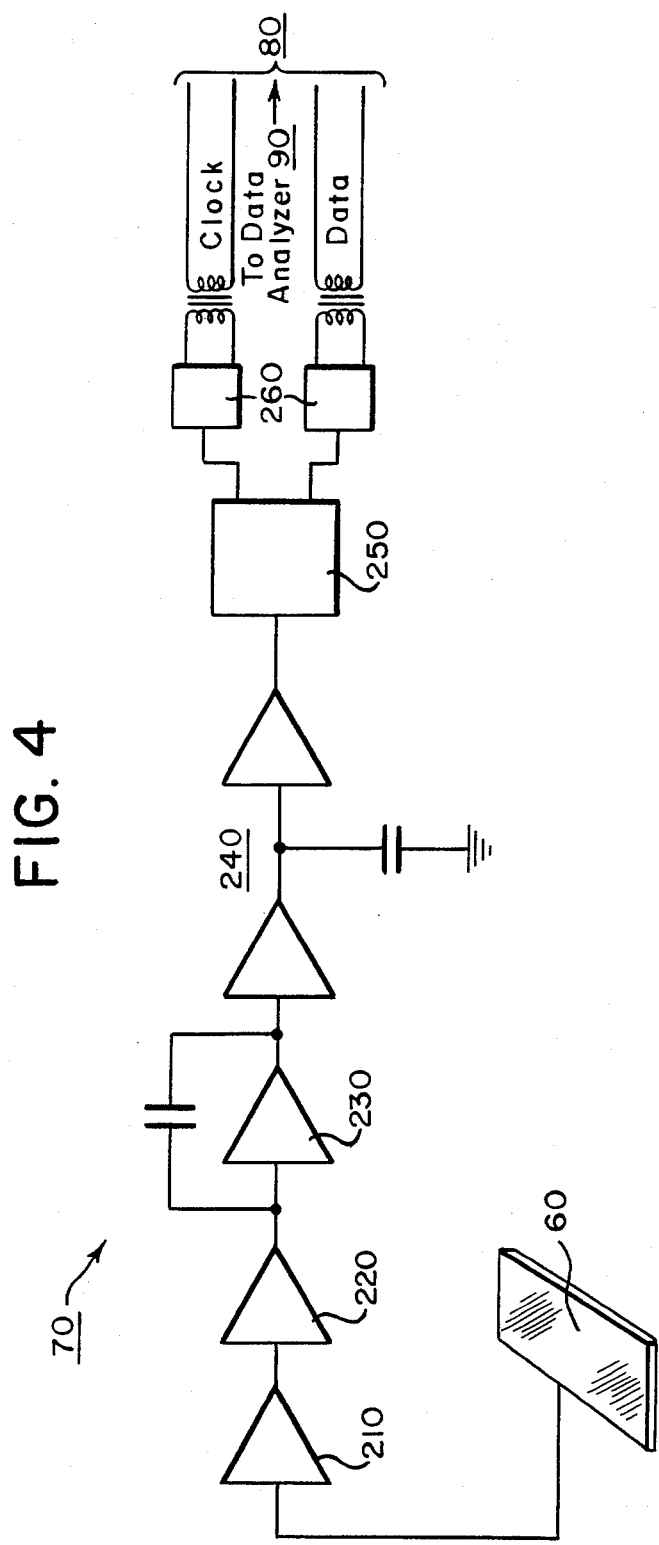
FIG. 4 is a block diagram of the electronics contained within the probe of FIG. 2.

A block diagram of electronic circuit 70 is set forth in FIG. 4. The circuit comprises a preamplifier 210 which is connected to detector 60, a differentiator 220, an integrator 230, a sample and hold circuit 240, an analog to digital converter 250 and a transmitter/receiver 260 which couples circuit 70 to a signal cable 80 that is connected to data analyzer 90. The detector illustratively is a cadmium telluride (CdTe) wafer having a surface area of 30 to 60 mm.$^2$ and a thickness of approximately 1 to 2 mm.

Each photon incident on the detector initiates a chain of events which produces a pulse of electrons whose magnitude is proportional to the energy of the photon. This pulse is converted to a voltage signal in preamplifier 210 which is a low noise, high gain amplifier. The output of preamplifier 210 is a signal having a relatively long duration on the order of one millisecond. To minimize signal pile up effects, each amplified pulse from preamplifier 210 is differentiated to produce a pulse about 3 microseconds long having an amplitude that is proportional to the energy of the incident photon that produced the pulse. Integrator 230 then smooths the output of differentiator 220. Sample and hold circuit 240 tracks each individual pulse produced by integrator 230 to its peak amplitude and stores this signal for analog to digital conversion by converter 250. The resulting digital signal which is proportional to the energy of the photon that produced the pulse is then transmitted in serial format by transmitter/receiver 260 to data analyzer 90. Synchronizing clock signals are also transmitted by the transmitter/receiver. In addition, transmitter/receiver 260 receives power from data analyzer 90 as well as a control signal indicating when the analyzer is ready to receive data from the probe.

Figure 5:
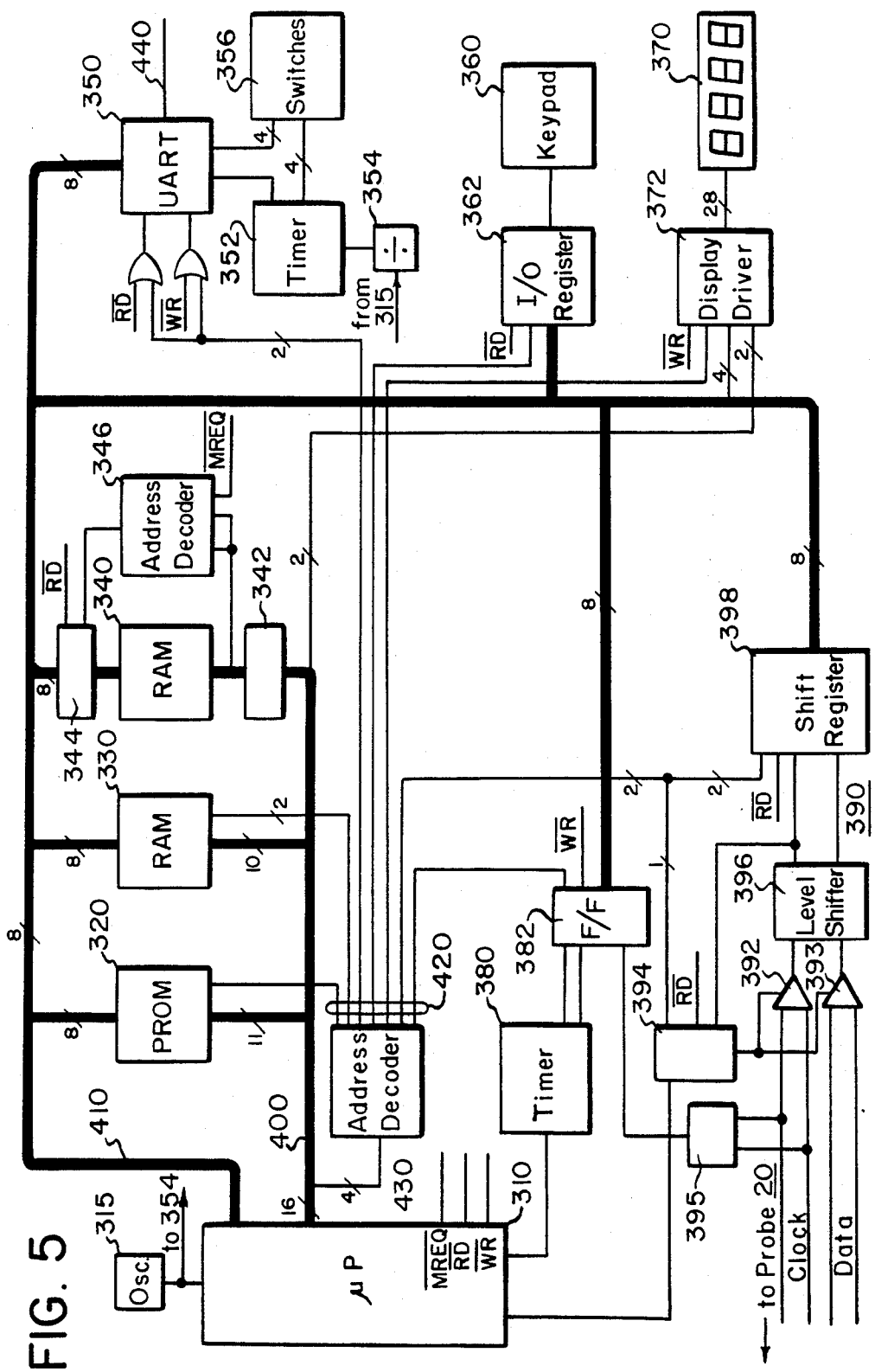
FIG. 5 is a block diagram of an illustrative embodiment of a data analyzer for use with the probe of FIG. 2.

Analyzer 90 counts the digital signals received that were produced by photons having energies within certain ranges of interest. From these counts, analyzer 90 determines the percent concentration of the element being assayed. As shown in FIG. 5, an illustrative embodiment of analyzer 90 comprises a microprocessor 310, a programable read only memory (PROM) 320, a first random access memory (RAM) 330, a second random access memory (RAM) 340, a universal asynchronous receiver/transmitter (UART) 350, a keypad 360, a display 370, a timer 380, and a data interface 390. These elements are connected together by an address bus 400 and a data bus 410. In addition, the operation of individual components of the circuit is controlled by one or more control signals on lines 420 from an address decoder 430 and/or by control lines such as $\overline{RD}$, $\overline{WR}$ and $\overline{MREQ}$ leading directly from microprocessor 310. Advantageously, data analyzer 90 is powered by a battery (not shown).

Microprocessor 310 is illustratively a Z80 microprocessor operating on a 2.5 MHz clock frequency supplied by an oscillator 315. Address decoder 430 is a 74154 one-of-sixteen decoder having an input that is four of address lines 400. Programable read only memory 320 and random access memories 330, 340 are conventional and may be implemented in various ways. In the embodiment shown, PROM 320 comprises two 2K×8 bit units of 2716-type programable read only memory. Each of these units may be addressed in parallel by 11 address lines in order to produce an 8 bit parallel output. The particular unit addressed is selected by one of two control lines from address decoder 430. PROM 320 stores the operating program which counts the digital signals received from probe 20 and determines the percent concentration of the element being assayed. RAM 330 comprises two 1K×4 bit units of 5114-type memory. This pair of units is addressed in parallel by 10 address lines to produce 8 parallel bits of output or to write 8 parallel bits into the memory. RAM 330 provides a scratch-pad memory and data storage used in calculation of percent concentration. RAM 340 comprises 8 pairs of 1K×4 bit units of 5114-type memory. This memory is addressed through a buffer register 342 and data is read from or written to this memory through a buffer register 344. An address decoder 346 provides for selection of the particular block of memory from which data is to be read or to which data is to be written. Illustratively the decoder is implemented in a 74154 one-of-sixteen decoder using four of the address lines as an input and two address lines and the $\overline{MREQ}$ control line from the microprocessor as controls. This decoder and the $\overline{RD}$ line from microprocessor 310 also control the operation of register 344.

UART 350 is an 1854-type interface between parallel data bus 410 and a serial communication line 440. A programable timer 352 which is connected through a divider circuit 354 to oscillator 315 provides clock signals for UART 350. Selection switches 356 are set so as to define the baud rate for serial data transmission on line 440. These switches may also be set to select parity options and framing characteristics. Operation of UART 350 is controlled by two control signals from address decoder 430 as well as by the $\overline{RD}$ and $\overline{WR}$ lines from microprocessor 310. Timer 352 illustratively is a 14536-type programmable timer.

Figure 6:
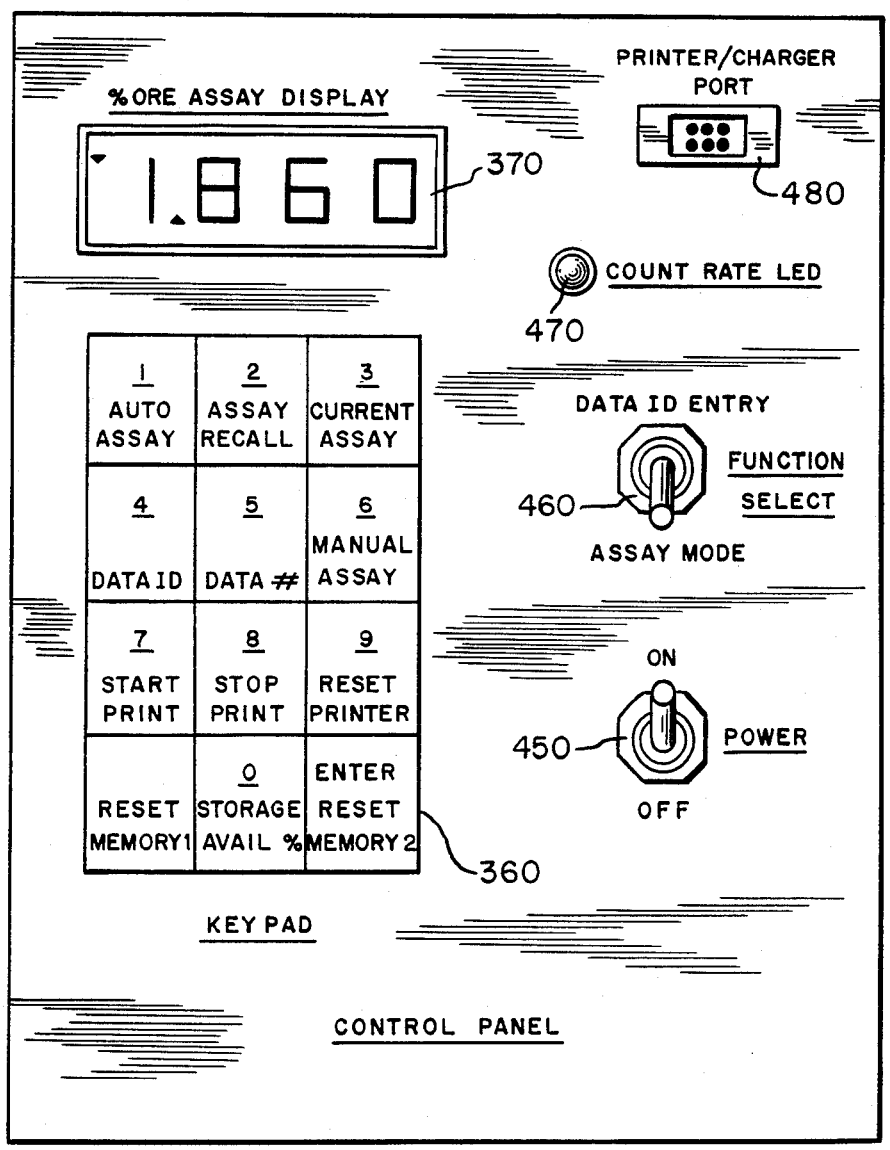
FIG. 6 is a plan view of an operator's panel for the data analyzer.

Keypad 360 is a conventional twelve key switch pad, the exterior of which is shown in FIG. 6. The output of the keypad is connected to data bus 410 through an I/O buffer register 362. Illustratively, this register is implemented in two 7097-type buffers.

Display 370 provides a conventional 4 digit 7 segment display likewise shown in FIG. 6. The display is driven by a display driver 372 which is a 7211-type driver. The signal to be displayed is supplied to the driver on four of the lines of data bus 410; and the display is controlled by a control line from address decoder 430 and the $\overline{WR}$ line from microprocessor 310. Two address lines from bus 400 are used to identify the individual display digit to which the signals on the four data lines apply.

Timer 380 is used to time the length of an assay. It is set and inhibited by signals from flip-flop 382. Timer 380 is a 14536-type programable timer; and flip-flop 382 is a 74374 octal D-type flip-flop with 3 output states. Signals are applied to flip-flop 382 from data bus 410 under control of a control signal from address decoder 430 and the $\overline{WR}$ signal from microprocessor 310.

Interface 390 comprises differential amplifiers 392, 393, control circuits 394, 395, a level shifter 396 and a shift register 398. The signals applied to amplifiers 392, 393 are the clock and data signals, respectively, from probe 20. The level of these signals is adjusted by level shifter 396 and the data signals from the probes are shifted into the shift register 398 by the clock signals received from the probe. Operation of the shift register is enabled by control lines from address decoder 430 and the $\overline{RD}$ signal from microprocessor 310. Control circuit 394 is a counter and comparator which counts the clock signals and determines from this count when shift register 398 is full. Upon reaching a full condition, the control circuit advises microprocessor 310 that the shift register is ready to be read and disables amplifiers 392, 393 so that no further data can be entered into the shift register. Control circuit 394 is reset by the microprocessor after the contents of the shift register have been read out. The level shifter is implemented in a 14504-type device and the shift register is implemented in a pair of serially coupled 14094 shift registers. These two shift registers are independently controlled from address register 430 so that their contents may be independently read onto data bus 410.

Signaling to the probe is accomplished through control circuit 395 which is connected to flip-flop 382. When a ready signal is to be transmitted to the probe this signal is supplied to flip-flop 382 on one of the lines of data bus 410. Upon receipt of the appropriate signals on the control line and the $\overline{WR}$ line, this signal is applied to control circuit 395. Control circuit 395 applies a ground signal to one of the two clock lines and a high signal to the other. This signal is interpreted by the probe electronics as an indication that the data analyzer is ready to receive data.

Data analyzer 90 processes the signals received from the probe so as to determine the concentration of the element or elements being assayed. The computer program for performing such analysis is stored in PROM 320; and RAM 330 is used as a scratchpad register in making the calculations for the assay. The assay results are stored in RAM 340. The results of individual assays can be displayed by display 370 upon a command from keypad 360. The results may also be printed out by a printer (not shown) which is coupled to the data analyzer via UART 350 and communication line 440.

The operator's control panel for data analyzer 90 is shown in FIG. 6. In addition to keypad 360 and display 370 the panel includes a power switch 450, a function select switch 460, a light emitting diode 470, and a plug 480 for connecting either a printer or a battery charger to the data analyzer. Diode 470 is illuminated for a brief period of time whenever detector 60 senses radiation within the signal range of the element being assayed. Thus, diode 470 operates as a visual indicator of the radiation. The keypad and function select switches perform the following functions. The system is immediately ready to operate when power is turned on. If the apparatus has previously been used to log data from previous assaying operations, the data may have been retained in RAM 340. To clear this memory, switch 460 is switched to the "Assay Mode" and the "Reset Memory 1" and "Reset Memory 2" buttons are pressed in that order. The data analyzer is then ready for the entry of new data.

In the present configuration of the data analyzer, up to 3,500 individual assays can be separately identified and stored within RAM 340 of the data analyzer. These assays can be grouped into as many as 64 blocks of data each identified by a "Data ID" number. To enter a "Data ID" number, the operator moves the function select switch to "Data ID Entry" and keys in the desired ID number on keypad 360. He then presses the "Enter" key.

To perform an assay, the function select switch is returned to the "Assay Mode". Two types of assay are available: a manual assay or an automatic assay, with the difference being that the operator controls the length of time of the manual assay while that of the automatic assay is predetermined by timer 380 of FIG. 5. To initiate a manual assay, the operator presses the "Manual Assay" key. In this mode the data analyzer will accumulate counts from the probe until the "Manual Assay" key is pressed a second time. To initiate an automatic assay, the operator presses the "Auto Assay" key. Upon completion of the assay in either the manual or auto mode, the assay value is displayed on display 370 and is stored in RAM 340.

The percentage of memory remaining available for storage of assay data can be displayed by pressing the "Storage Avail %" key. When the operator would like to print the data stored in memory, he presses the "Start Print" key to deliver the stored data to a hard copy printer. The "Stop Print" key halts the printer in such a fashion that it will start again where it was halted by pressing the "Start Print" key. The "Reset Printer" key resets the printing operation so that the printer begins printing again from the beginning of the stored data.

After the stored assays have been transferred to the hard copy printer, the memory may be cleared by pressing the "Reset Memory 1" and "Reset Memory 2" keys in that order. If this key sequence is entered in error, the memory can be recovered by the reverse process of pressing "Reset Memory 2" and then "Reset Memory 1".

The "Assay Recall" key will recall the previous assay taken and will display it on display 370. When pressed repeatedly, this key will step backwards through memory displaying each of the assays stored all the way back to the first. In the case of such a display, the "Data ID" key will display the data identification number associated with the previously displayed assay and the "Data #" key will display the number of the particular assay within the data block. The "Current Assay" key returns to the display the result of the most recent assay performed and returns the data analyzer to the point where it is ready to begin logging new data.

An illustrative example of the data that are collected in an assay of uranium ore is set forth in Table 1.

TABLE 1

| 00000 | 03338 | 36750 | 37652 | 38920 | 39899 | 41304 | 41700 |
|---|---|---|---|---|---|---|---|
| 41285 | 37247 | 27552 | 18906 | 14857 | 11579 | 09485 | 07907 |
| 06510 | 05305 | 03658 | 03060 | 02819 | 02561 | 02717 | 02542 |
| 02109 | 01805 | 01562 | 01397 | 01369 | 01258 | 01222 | 01174 |
| 01119 | 01013 | 00980 | 00878 | 00775 | 00706 | 00648 | 52597 |

Figure 7:
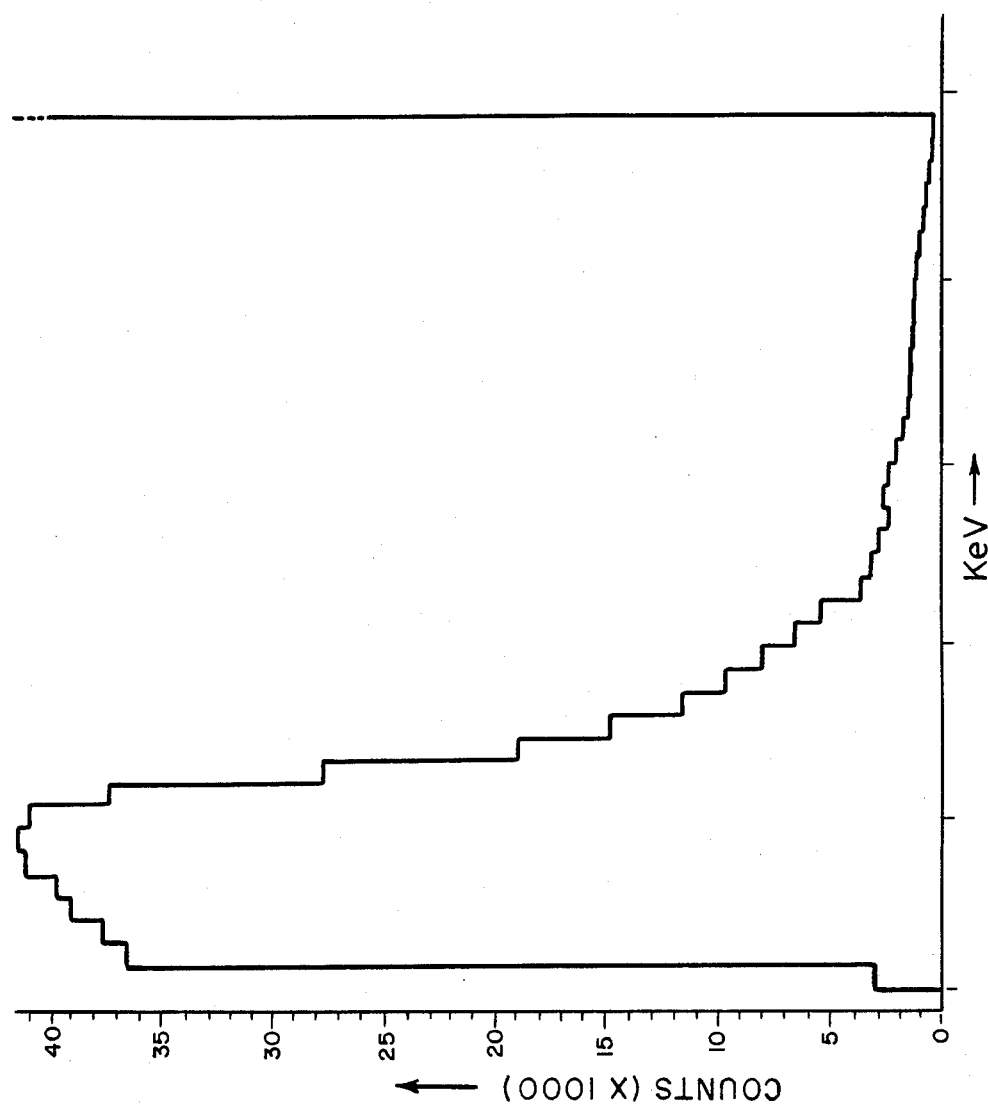
FIG. 7 is an illustration of a typical X-ray fluorescence spectrum.

Each five digit number in the table represents the number of photons sensed by the probe detector during a two minute assay within a specified energy range. For the example of Table 1, each energy range is approximately 1.8 KeV and the 40 ranges represented in Table 1 span the spectrum from about 72 to 140 KeV. The counts reported for the first two ranges are limited by a threshold detector; and those reported for the last range include all photons detected having energies above about 140 KeV. In reading the table, energy ranges increase from left to right and the energy ranges in each row are greater than those in the row above them. As will be apparent from inspection of the table, there is a peak in the readings in the upper right hand corner of the table. This peak is the Compton peak and is located at about 78 to 84 KeV. The edge range is at about 84 to 90 KeV at the middle of the second row. The signal range is located at about 94 to 104 KeV, which is the right most entry of the second row and the left hand side of the third row of Table 1. The background range is located at about 118 to 128 KeV, which is the right hand portion of the fourth row. An illustrative plot of the spectrum represented by Table 1 is set forth in FIG. 7.

The data analyzer accumulates counts in a form such as that of Table 1 and then analyzes these counts to calculate the percent concentration of the element being assayed. Preferably, this percent concentration is determined in accordance with the following formula:

$$\% \text{ conc.} = \left(\frac{S - K_1 \cdot B}{C - K_2 \cdot B}\right) \cdot (K_3 + K_4 \cdot E/C) + (K_5 + K_6 \cdot E/C)$$

where S is the number of counts detected in the signal range, C is the number of counts detected in the Compton range, B is the number of counts detected in the background range, E is the number of counts detected in the edge range and $K_1$ through $K_6$ are constants which are empirically determined for the probe that detects the counts. These constants are determined in advance of the assay and stored in PROM 320. For the example set forth in the data of Table 1,
S = 7907 + 6510 + 5305 + 3658 + 3060 = 26440;
C = 41700 + 41285 + 37247 = 120232;
E = 27552 + 18906 + 14857 = 61315; and
B = 1397 + 1369 + 1258 + 1222 + 1174 = 6420. These data are stored in RAM 330.

Figure 8:
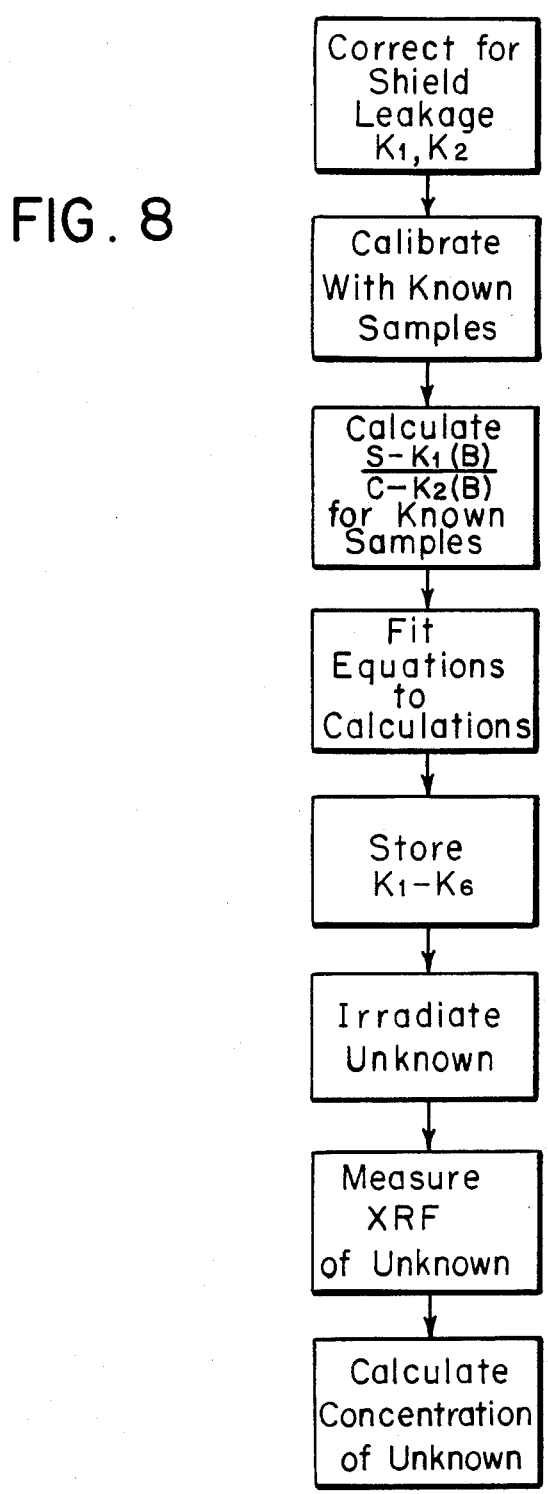
FIG. 8 is a flow chart depicting an illustrative embodiment of a process for performing an assay in accordance with the invention.

A flow chart of the process for calibrating probe 20 and for determining percent concentration is set forth in FIG. 8. As shown therein, the source and the detector are first corrected for the effects of shield leakage by determining the values $K_1$ and $K_2$. Next, the source and detector are calibrated by measuring the radiation received at the detector from a group of samples having a known concentration of the element to be assayed each of which samples is arranged in the same geometrical relationship with the source and the detector. From these measurements, the term $(S - K_1 \cdot B)/(C - K \cdot B)$ is calculated for each concentration sample. An equation is then fitted to these terms using one or more correction factors to relate the concentration of the samples of known concentration to the magnitudes of these terms. The correction factors are then stored in machine-readable form in an electronic processor. An object having an unknown concentration of the same chemical element is then irradiated by the source with no preparation of the object or control over the geometrical relationship between the source/detector and the object. Thus the object typically has a rough surface and the distance between the probe and the object varies depending on the size of the probe and the borehole. The radiation produced by the source is measured in the same fashion as the calibration step was performed; and from the measured values and stored correction factors the concentration of the chemical element is determined.

$K_1$ and $K_2$ are scaling factors which relate the number of counts measured in the background range of energies to the number of counts present in the signal and Compton ranges which are attributable to leakage of the source radiation through the shielding. These values depend on the particular geometry of the source and detector and the shielding between them as well as on the relative sizes of the signal, Compton and background ranges. They are determined from observed counts of X-ray photons in the signal, Compton and background ranges in the absence of the element being assayed by setting $K_1 = S/B$ and $K_2 = C/B$. By way of illustration $K_1 = 1.1714$ and $K_2 = 0.79778$ for one probe similar to that shown in FIG. 2 that has been used in the practice of our invention with a 6 KeV Compton range, a 10 KeV signal range and a 10 KeV background range.

The remaining constants provide a slope and an intercept which relate the percent concentration of the element being studied to the term $(S - K_1 \cdot B)/(C - K_2 \cdot B)$. The constants $K_3$ through $K_6$ are determined from a series of measurements of reference samples having known percent concentrations distributed throughout the range of concentrations over which the probe is to be used. For each such sample, the source, the detector and the sample are arranged in the same geometrical relationship; and the probe is used to count the number of X-ray photons detected in the signal, Compton and background ranges. From these values, the quantity $(S - K_1 \cdot B)/(C - K_2 \cdot B)$ is calculated for each sample; and to these quantities a least squares fit of a straight line is made. An illustrative plot of percent concentration versus the quantity $(S - K_1 \cdot B)/(C - K_2 \cdot B)$ is set forth in FIG. 9. As will be apparent a straight line fitted to these data will have the general form $y = mx + b$ where y is the percent concentration, x is the quantity $(S - K_1 \cdot B)/(C - K_2 \cdot B)$, m is the slope of the line and b is the intercept.

A significant source of error in the detector is variations in its gain due to temperature changes, drift and the like. Such changes in gain cause the detector to misread the energies of the received X-ray radiation as amounts greater or less than the true value. We have found that the slope and intercept terms vary significantly as a function of the ratio E/C, which is a sensitive measure of how accurately the detector has related the observed counts to the correct energy range, and that variations in the slope and intercept terms with respect to observed values of E/C can be used to compensate for changes in gain. Accordingly, we set the slope of the straight line of FIG. 9 equal to $K_3 + K_4 \cdot E/C$ and the intercept equal to $K_5 + K_6 \cdot E/C$.

To determine the variation of the slope and intercept terms with respect to E/C, a computer simulation is made of the effect of small shifts in the observed energy ranges on the values of the term $(S - K_1 \cdot B)/(C - K_2 \cdot B)$ for the measurements of the reference samples and on the slope and intercept of the least squares fit to these values. In particular, we calculate the value $(S - K_1 \cdot B)/(C - K_2 \cdot B)$ for each of the reference samples for each of five different shifts in the observed energy ranges. For each of these five shifts, a least squares fit of a straight line is made for the calculated values of $(S - K_1 \cdot B)/(C - K_2 \cdot B)$ and the slope and intercept of each of these five lines is determined.

Figure 9:
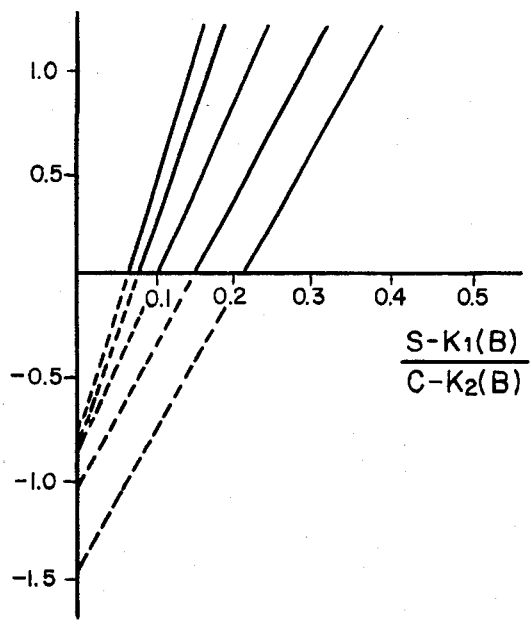
FIG. 9 and 10 are plots of typical X-ray fluorescence data useful in understanding the determination of calibration factors.

As shown in FIG. 9, for smaller values of the ratio E/C, less X-ray fluorescence is counted in the signal range S, causing the relation between concentration and the critical statistic, $(S - K_1 \cdot B)/(C - K_2 \cdot B)$, to be more vertical. For larger values of E/C, more X-ray fluorescence and more Compton backscatter is counted in the signal range S, causing the relation between concentration and the statistic, $(S - K_1 \cdot B)/(C - K_2 \cdot B)$ to be more horizontal and shifted to the right.

The five values for the slope and the five values for the intercept are each functions of the ratio E/C. A plot of illustrative such values for the slope and intercept as functions of E/C is set forth in FIG. 10. As shown therein, at lower values of the ratio E/C, the slope term $(K_3 + K_4 \cdot E/C)$ increases because the X-ray fluorescence signal is being shifted out of the signal range S. At higher values of E/C, the intercept term $(K_5 + K_6 \cdot E/C)$ decreases to compensate for the counts shifted into the signal range S due to Compton backscatter. Within the normal range of gain errors that are likely to be experienced by the detector, there are only a single value of the slope and a single value of the intercept for each value of E/C. Hence, for an observed value of the ratio E/C it is possible to obtain by interpolation between the slope values a single value of a slope correction and by interpolation between the intercept values a single value of an intercept correction. For linear interpolation, the computer calculates the slopes $K_4$, $K_6$ and intercepts $K_3$, $K_5$ of straight lines between the five slope values and the five intercept values, respectively, and stores these values in RAM 330 as functions of specified ranges of E/C. Thus data analyzer 90 stores a first piecewise linear approximation to a curve which relate the slope m to the value of E/C and a second piecewise linear approximation to a curve which relates the intercept b to the value of E/C. For example, for the illustrative plot of FIG. 10, when $0.46337 < E/C < 0.63002$
$K_3 = 19.3344$
$K_4 = -16.2735$
$K_5 = -0.94179$
$K_6 = 0.030363$.

For the example of Table 1, $E/C = 0.509972$. Substituting the above values for S, C, E and B and the values for $K_1$ through $K_6$, the percent concentration of the element whose assay is reported in Table 1 is 0.846%.

Figure 10:
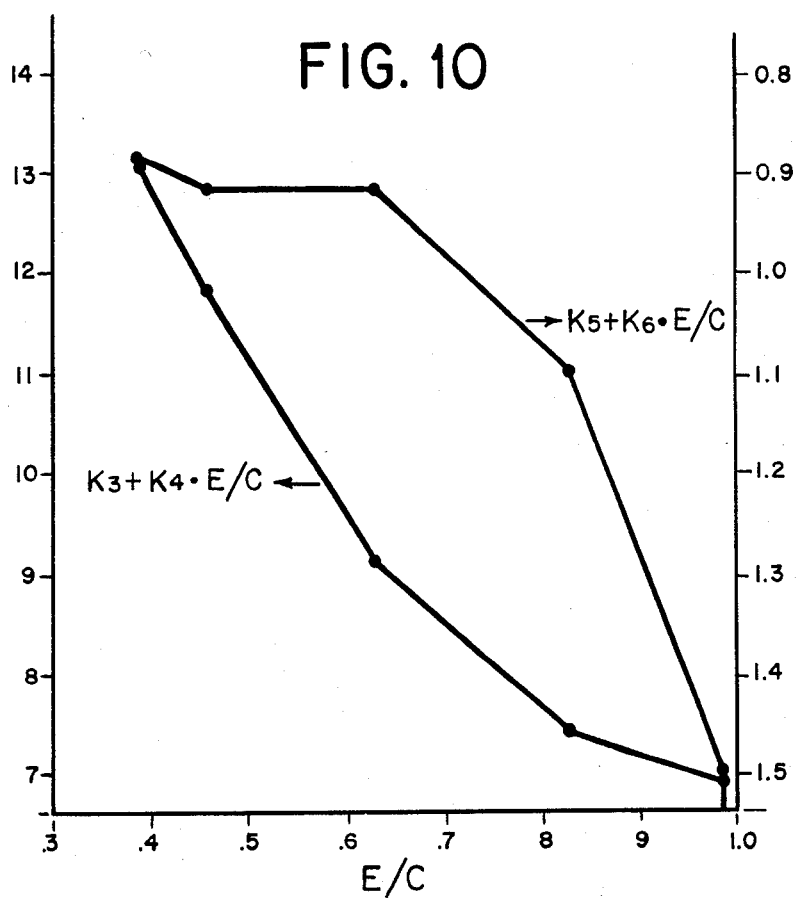

For the example shown in FIGS. 9 and 10, note that 0.500% $U_3O_8$ will give $(S - K_1 \cdot B)/(C - K_2 \cdot B)$ equal to 0.157 when E/C is 0.63. Instrumental drift of ±2 kev, corresponding to E/C equal to 0.46 or 0.83, changes $(S-K_1 \cdot B)/(C-K_2 \cdot B)$ to 0.121 or 0.214 respectively. If uncompensated for, these values, when read on the E/C=0.63 line, would yield incorrect assays of 0.177% of 1.023% $U_3O_8$. Instrumental drift of 1.8 kev has been observed under laboratory conditions.

The calculation of percent concentration by the foregoing equation permits the determination of concentrations of elements with unusually high accuracy. In tests we have performed, the correlation coefficient between concentrations determined by X-ray fluorescence using this equation and those determined by the wet chemical analysis has been greater than 0.99. The equation can be modified in many ways to accommodate different circumstances or simplify the calculation. For example, it has been our experience that correction for shield leakage has little effect on the ultimate accuracy of the measurement. Accordingly, the constants $K_1$ and $K_2$ could be eliminated. The practice of dividing the signal counts by the Compton counts is standard procedure in X-ray fluorescence spectroscopy which is sometimes called normalizing to the backscatter peak. This normalization technique accommodates variations in the geometry of the borehole and changes in the composition of the surrounding matrix. We have found that the use of slope and intercept terms which vary as a function of E/C provides a significant improvement in the correlation between the X-ray fluorescence measurements and wet chemical analyses. The ratio E/C is particularly advantageous to use since this ratio is monotonic over the usual range of gain variations and is highly sensitive to small shifts in gain. However, other measures of the change in gain can be devised and the slope and intercept terms can be made functions of such surrogates.

Advantageously, the width of the Compton and edge ranges are the same but the invention may be practiced using different widths. The width of the signal range should be large enough to encompass the signal from the element being assayed. Typically, it is wide enough to encompass both lines of the $K\alpha$ doublet that is emitted by the element being assayed. For the example given in table 1, the signal range is twice that of the Compton range. The background range is selected so as to accommodate enough counts to eliminate substantially the effect of random events such as cosmic radiation in the background energy range. For the example of Table 1, the background range is approximately as wide as the signal range.

Figure 11:
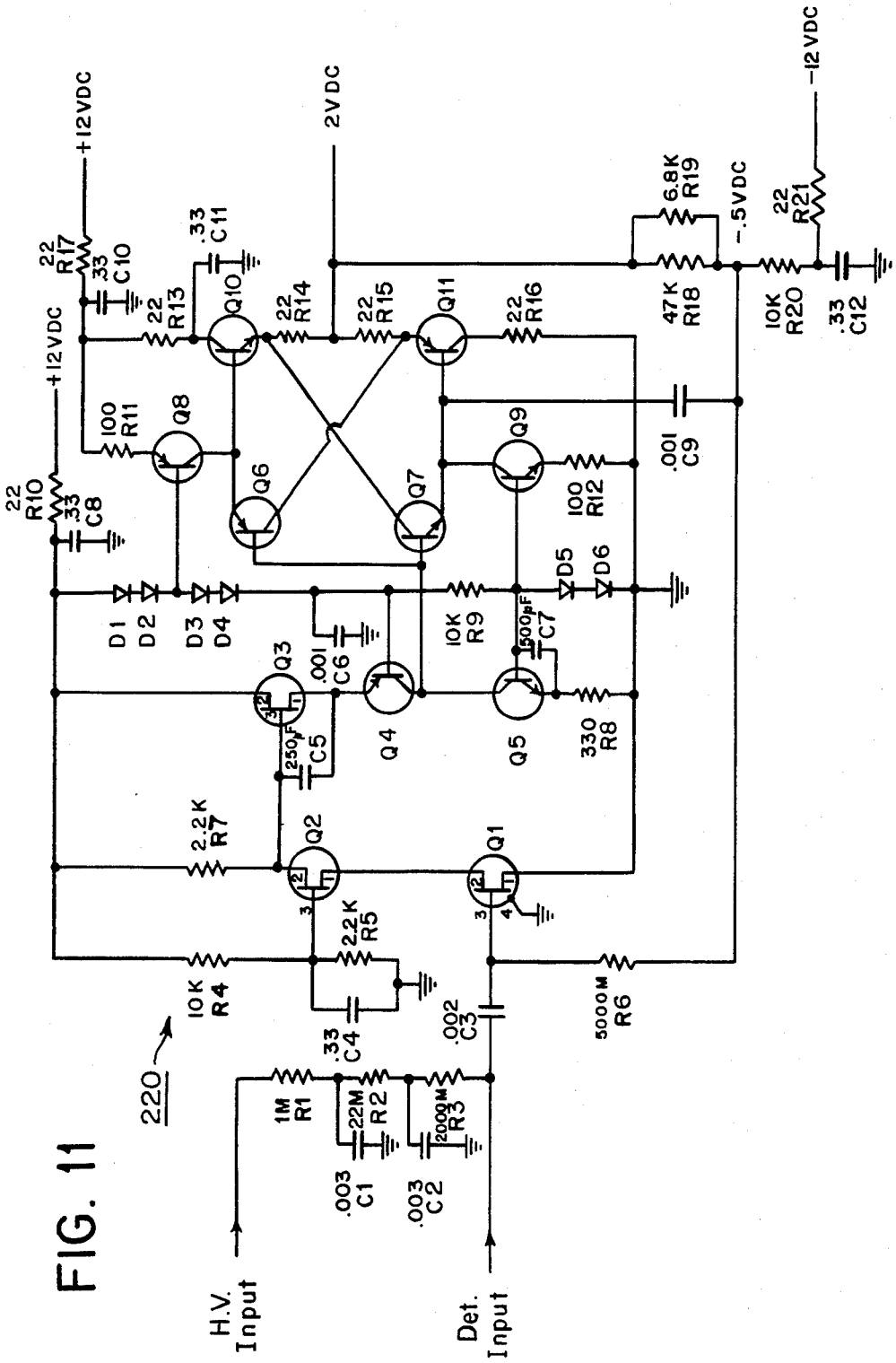
FIGS. 11, 12, 13 and 14 are schematic diagrams of illustrative embodiments of certain components of the probe electronics of FIG. 4.

Details of the probe electronics are set forth in FIGS. 11 through 14. Preamplifier 220, which is shown in FIG. 11, is a high gain low-noise design that produces a voltage pulse directly proportional to the amount of energy that enters detector 60 to which it is connected. This type of preamplifier is generally known in the art as a charge-sensitive preamplifier. A high voltage input is applied to a filter network comprising resistors R1, R2, and R3 and capacitors C1 and C2. This network filters out short term variations in the high voltage power supply and provides the correct bias voltage to the detector.

The output of this network is supplied to detector 60. When a photon of energy enters the detector, it produces an input pulse of electrons (or charge) that is coupled through capacitor C3 to the base of field effect transistor Q1 which serves as the input stage of the preamplifier. Input transistor Q1 is cascode coupled to transistor Q2, a low-noise field effect transistor such as a Texas Instrument type 2N 4857. Resistors R4 and R5 connected to the circuit's positive DC voltage supply the proper bias voltage for transistor Q2. Capacitor C4 serves as a low impedance path for any spurious voltage occuring at the gate of Q2.

The current through transistors Q1 and Q2 and resistor R7 varies in accordance with the magnitude of the electron pulse coupled to transistor Q1 causing the voltage drop across R7 to vary proportionally. The varying voltage at the drain of transistor Q2 is thus applied to the gate of transistor Q3, also a Texas Instrument 2N 4857. Transistor Q3, which is stabilized against oscillation by capacitor C5 operates as a follower driving transistor amplifier Q4. Current through transistor Q3 is thus caused to vary in accordance with the magnitude of the input pulse. This current flows through transistor Q4, transistor Q5, and resistor R8. Transistors Q4 and Q5 are biased by a network comprising diodes D1 through D6 and resistor R9. Capacitor C6 filters the base of transistor Q4. Transistor Q5 serves as a constant current source for transistor Q4. Capacitor C7 suppresses transients at the base of transistor Q5. Resistor R8 limits current through transistors Q3, Q4, and Q5.

Because the impedance looking into the collector of transistor Q5 is very large, a small change in current causes a very large change in voltage. The voltage produced at the collector of Q5 which is also proportional to the magnitude of the input pulse is connected to the base of transistor Q6 and the base of transistor Q7 which together with transistors Q10 and Q11 and associated resistors R13, R14, R15, and R16 comprise a complementary Darlington output group which serves as a line driver. This line driver provides an output at the point of connection of R14 and R15 which varies proportionately with the magnitude of the input pulse to transistor Q1. Transistors Q8 and Q9 are biased by the network of diodes D1 through D6 and resistor R9 and serve as constant current loads for transistors Q6 and Q7, respectively, with current limiting and balancing provided by resistors R11 and R12. Capacitor C11 provides an AC return to ground for the collector of Q10.

The resistor network comprising R18 through R21 is a voltage divider that provides DC feedback in the form of a small negative bias to Q1 through resistor R6. AC feedback is supplied to transistor Q1 by means of capacitor C9 which is also connected to resistor R6. Capacitor C12 serves to filter any variations in the voltage, typically −12 volts DC, which is supplied to resistor R21.

The network comprising resistors R10 and C8 filters the positive direct current source, preferably 12 volts, used to drive all the transistors except those associated with the operation of the complementary Darlington output group. The network comprising R17 and capacitor C10 serves the same function for those transistors which are associated with the output group.

Differentiator 220 is a conventional differentiator implemented using an operational amplifier such as a 318-type amplifier. Integrator 230 likewise is a conventional integrator implemented in known fashion using another 318-type operational amplifier.

Figure 12:
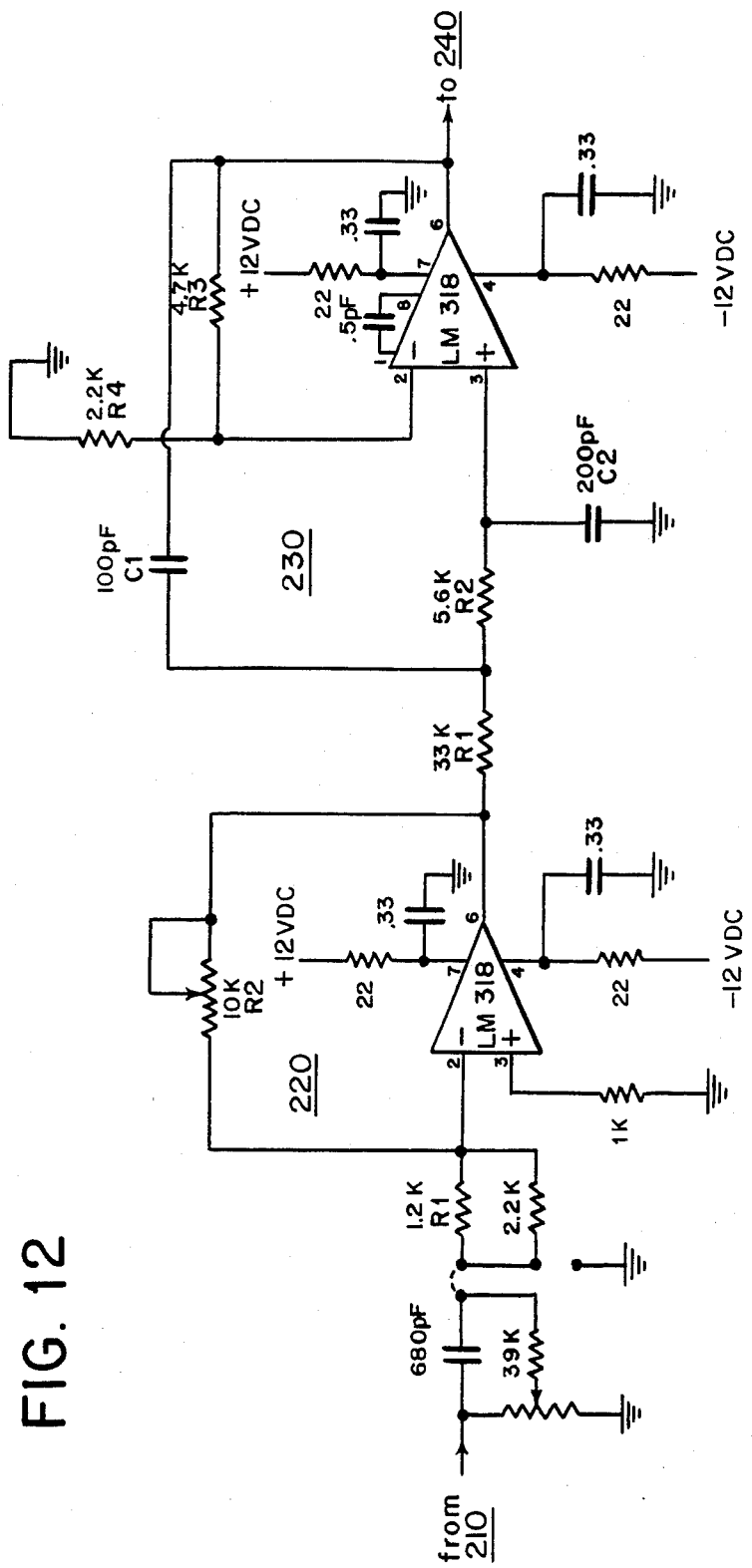
Figure 13:
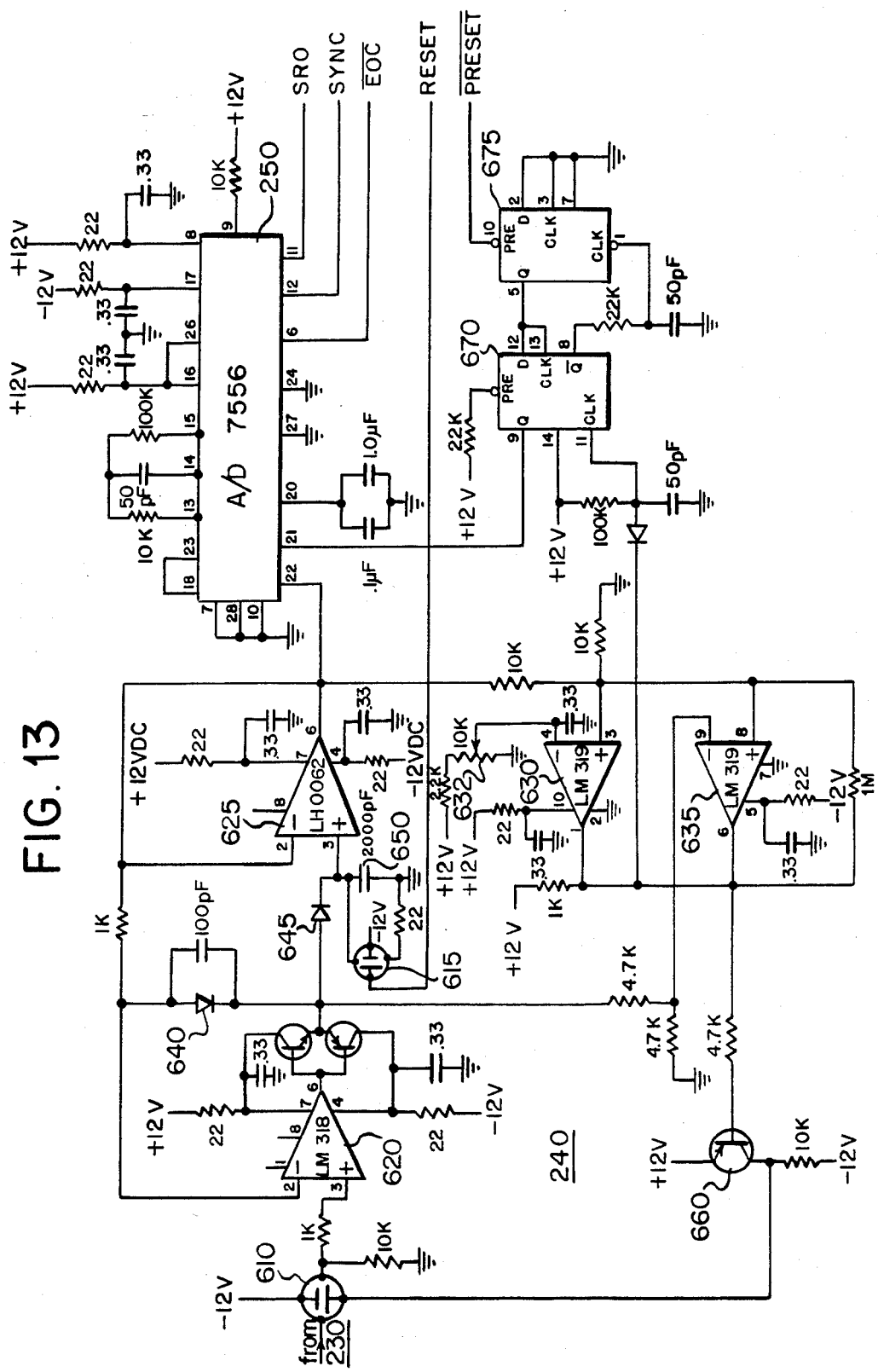
Figure 14:
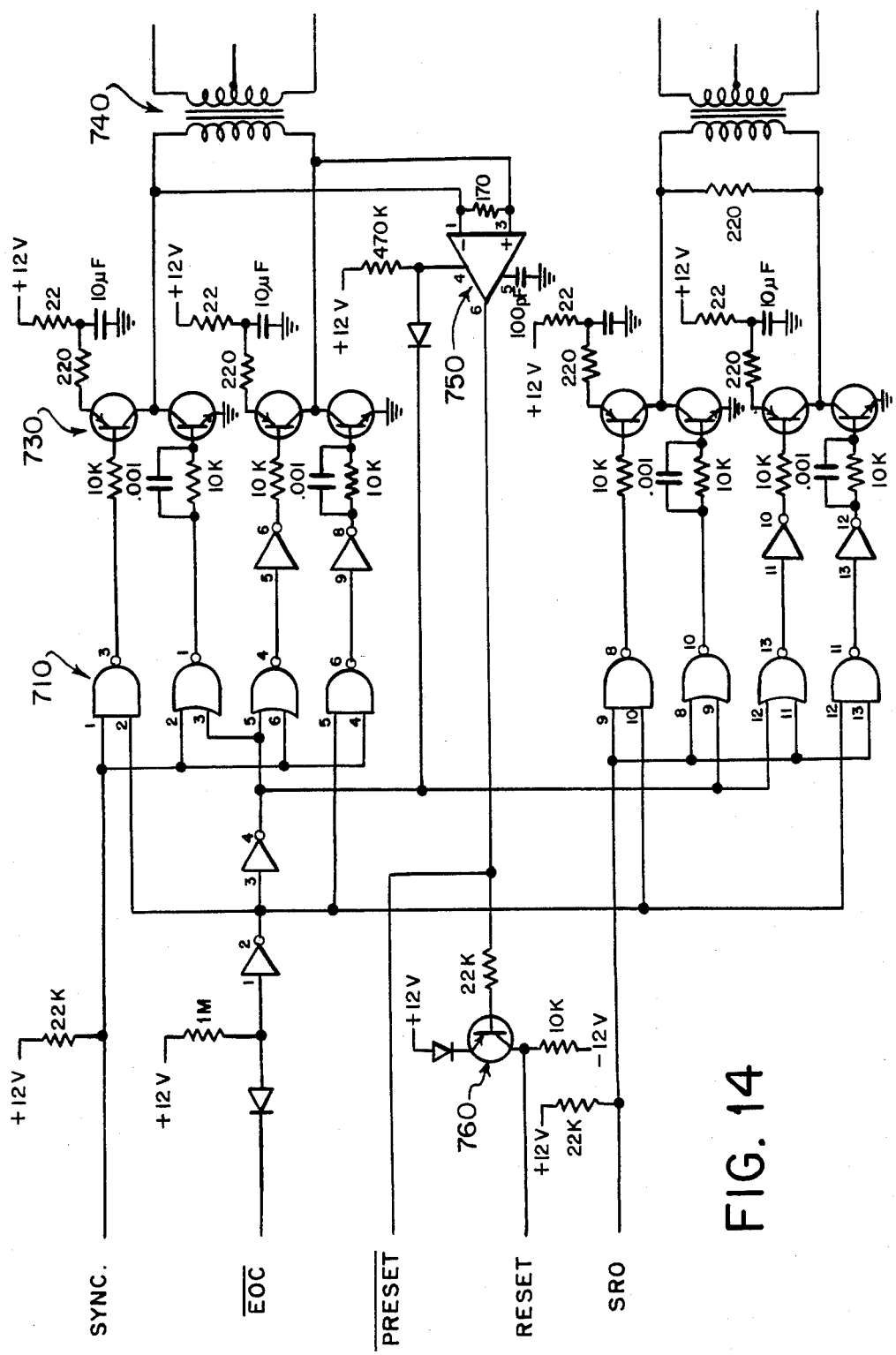

Details of sample and hold circuit 240 and analog to digital (A/D) converter 250 are disclosed in FIG. 12. As shown therein, sample and hold circuit 250 comprises analog switches 610, 615, operational amplifiers 620, 625, comparators 630, 635, diodes 640, 645, capacitor 650, transistor 660 and flip-flops 670, 675. The signal to be sampled is stored by capacitor 650 and is read by A/D converter 250 from the output of amplifier 625. To sample a signal, the output of comparator 635 must be low causing transistor 660 to be on. As a result, the signal at the gate of analog switch 610 is high and a conductive path is established between the output of integrator 230 and the non-inverting input terminal of amplifier 620. The signal to be sampled charges capacitor 650 through amplifier 620 and diode 645. The output of amplifier 625 follows the voltage across capacitor 650. After the peak of the signal being sampled is reached and the signal voltage begins to descend, the voltage at the output of amplifier 620 becomes less than that across capacitor 650 and diode 645 becomes reverse biased. As a result, the peak voltage is stored by capacitor 650 and is available at the output of amplifier 625.

Comparator 635 functions as a peak detector. When the signal at the output of amplifier 620 falls below that at the output of amplifier 625, this is sensed by comparator 635 and its output goes high, turning off transistor 660 and ending signal transmission through analog gate 610. At the same time, the signal from the output of comparator 635 clocks flip-flop 670 causing a start signal to be applied to analog to digital converter 250. The converter begins the process of forming a digital representation of the analog signal at the output of amplifier 625. When this conversion is completed, this signal is transmitted via transmitter/receiver 260 and signal cable 80 to data analyzer 90.

When the data signal has been received by the data analyzer, a signal is returned to the probe indicating that the data analyzer is ready to receive more data. This signal produces a $\overline{\text{PRESET}}$ signal which is applied to analog switch 615 to dump the signal stored by capacitor 650 and also a RESET signal which is applied to the output of flip-flop 675. When the signal stored by capacitor 650 is dissipated, the output of amplifier 625 goes low enough that comparator 635 changes state once more, providing a low signal to transistor 660. This turns on transistor 660 and makes analog switch 610 conductive once more. As a result, the sample and hold circuit is again ready to process a signal. Comparator 630 operates as a low-level discriminator. If the signal at the output of amplifier 625 is too low, as determined by the setting of potentiometer 632, comparator 630 holds the output of comparator 635 high and prevents the clocking of flip-flop 670.

Transmitter/receiver 260 is a conventional circuit comprising logic gates 710, transistors 730 and transformers 740. When a signal is to be transmitted, a high sync or data signal causes current flow in one direction in the appropriate transformer while a low sync or data signal causes current flow in the opposite direction. Signals from the data analyzer are received by amplifier 750. The output of amplifier 750 is the $\overline{\text{PRESET}}$ signal applied to flip-flop 675. This signal is also inverted by transistor 760 to supply the preset signal.

The operation of our invention in making a borehole mineral assay will be apparent. The borehole is drilled and the probe is lowered into the hole. As the probe is being lowered, the operator observes light emitting diode 470 on the operator's control panel. If no radiation is received at the probe that is characteristic of the x-ray fluorescence spectrum of the element being assayed, the diode is not lighted and there is no reason to take an assay. When sufficient characteristic radiation is received, the diode alerts the operator to the desirability of performing an assay and the operator initiates the assay with the "Manual Assay" or "Auto Assay" key. After the data is recorded, the assay value is displayed on display 370 and stored in RAM 340.

While the data of Table 1 relates to an assay for uranium, our invention may be practiced to assay any chemical element. Obviously, in such assays it may be desirable to use other sources to produce X-ray fluorescence and/or other detectors to sense the X-ray radiation. Its advantages in precious metals and rare elements exploration will be apparent.

In addition to performing quantitative assays of the concentration of elements present in a matrix, our invention may also be used in a qualitative manner, for example, in a minerals survey. Thus, a probe containing a source having radiation of a wavelength appropriate to produce X-ray fluorecence in every one of the chemical elements may be lowered into a borehole; and the X-ray spectrum produced by irradiation may be examined at each point in the spectrum where X-ray fluorescence would be produced by an element if the element in question were present. Once the presence of a particular chemical element was established, a quantitative assay of its concentration could be made. Combinations of qualitative and quantitative capabilities in the same equipment and in the same borehole assay will likewise be apparent.

In addition to borehole mineral assays, our invention may be used in other fields of mineral exploration such as mine face assays and ground surface assays. The invention may also be used for remote sensing in other environments such as oceanographic and extra-terrestrial exploration. Since the apparatus does not have to be calibrated between periods of use, the speed of any assay or element detection procedure is greatly decreased. Numerous other applications will be apparent: the bulk assay of ore as, for example, in grading and/or sorting devices, the detection of trace elements in process streams, quality assurance and material analysis. The invention can also be used to detect objects hidden in baggage or freight by using the invention to detect the presence of characteristic elements in such objects or characteristic concentrations of such elements. In medical applications, the invention may be used, for example, to monitor the movement of a chemical element through the body.

Different configurations of the apparatus are used for different applications. The use of a probe for borehole assays is described in detail above. When used for surface assay applications, the source and detector advantageously are incorporated in a hand held pistol-like device. For medical applications, the source and detector advantageously are mounted on an articulated scanning head. One or more of these configurations will generally be suitable for the other applications described above.

As will be apparent to those skilled in the art, our invention may be practiced in many forms. The specific electronic circuit described above for the probe and data analyzer are illustrative and alternatives will be apparent to those skilled in the art. If desired, a microprocessor can be incorporated into the probe itself where it can perform the assay and calculate percent concentration of the element. In such circumstance, only the results of the assay need be transmitted to a control unit and display located outside the borehole. For such a configuration, assay data advantageously would be stored at the control unit. Numerous other variations will be apparent to those skilled in the art.

Advantageously, the detector is a cadmium telluride wafer operated at ambient temperature. While such a detector has relatively low resolution on the order of 7-12 KeV, the calibration procedure of our invention makes feasible the use of such a detector to perform quantitative assays and eliminates the need to recalibrate during or between assays. If desired our invention may also be practiced using other detectors such as Germanium or Mercuric Iodide. Other sources may be used to produce the X-ray fluorescence.

Numerous variations may be made in the signal processing described. Obviously, the energy range of the Compton backscatter peak will vary depending on the energy or energies of the particular source used to irradiate the object to be assayed. Where the source has more than one emission energy, the particular energy range may be selected to optimize signal detection. Instead of using radiation in the range about the Compton backscatter peak for calibrating the source and detector, it may be advantageous to use any other available radiation peak. In general, however, the gain correction should use a ratio that is highly sensitive to small displacements in the energy ranges caused by gain shifts. The ratio of the radiation detected in a range adjacent the radiation peak to the radiation in the peak is quite sensitive to such small displacements since this ratio is relatively small when the gain is properly adjusted and is large when the gain is in error. Other ratios such as that of the radiation low on the slope of a radiation peak to that of the radiation high on such a slope may prove advantageous.

If desired, portions of certain energy ranges may be ignored in calculations or modified to make further refinements in the invention. For example, since the K spectrum is a doublet, it may be desirable to divide the range where X-ray fluorescence is observed into two regions and combine the measurements made in each range with or without weighting of such measurements. Curve fitting methods other than least squares fits to straight lines and linear interpolation may also prove advantageous. These and numerous other variations will be apparent to those skilled in the art in light of the foregoing description.

What is claimed is:

1. An X-ray fluorescence method for assaying the concentration of a chemical element in an object using a source of particles or electromagnetic radiation having sufficient energy to produce X-ray fluorescence of said element and a detector capable of detecting a spectrum of X-ray fluorescence from said element, said method comprising the steps of:
    calibrating the source and detector by:
        irradiating with said source a group of samples of different known concentrations of the element to be assayed;
        measuring with said detector the X-ray radiation received at the detector from said samples having energies in a first range which encompasses at least one X-ray fluorescence spectral line associated with said element, whereby a plurality of measurements are obtained corresponding to the different samples;
        fitting a first equation to said measurements, said equation relating the concentration of the samples of known concentration to said measurements using at least a first correction factor; and
        storing said correction factor or a function thereof;
    irradiating an object having an unknown concentration of said chemical element with said source of particles or electromagnetic radiation, said source and object having a geometrical relationship that need not be controlled and is not necessarily the same as that of the source and samples in said calibrating step;
    measuring with said detector the X-ray radiation received from said object having energies in the same range as that in which said X-ray fluorescence spectral line was measured in said calibrating step, whereby an assay measurement is obtained; and
    using an equation of the same general form as said first equation to calculate from said assay measurement and said stored correction factor or function thereof the concentration of said chemical element in said object.

2. The method of claim 1 wherein the equation that is fitted to said measurements has the form:

percent concentration$=A+B\cdot S$ where S is a function of the X-ray radiation received at the detector from said samples having energies in said first range, and A and B are correction factors.

3. The method of claim 1 wherein the equation that is fitted to said measurements has the general form:

percent concentration$=A+B\cdot S/C$ where S is a function of the X-ray radiation received at the detector from said samples having energies in said first range, C is a function of the X-ray radiation received at the detector having energies in a second range where the Compton peak is observed, and A and B are correction factors.

4. The method of claim 2 or claim 3 wherein A and B are functions of the ratio of the X-ray radiation received at the detector which has energies in a third range adjacent that in which the Compton peak is observed to the X-ray radiation received at the detector having energies in said second range.

5. The method of claim 2 or claim 3 wherein A and B are functions of the ratio of the X-ray radiation received at the detector which has energies in a range within which a known radiation peak is observed to the X-ray radiation received at the detector which has energies in a range adjacent to that within which said known radiation peak is observed.

6. The method of claim 1 wherein the equation that is fitted to said measurements is:

percent concentration $=$ $$\left(\frac{S - K_1 \cdot B}{C - K_2 \cdot B}\right) \cdot (K_3 + K_4 \cdot E/C) + (K_5 + K_6 \cdot E/C)$$

where S is a function of the X-ray radiation received at the detector from said samples having energies in said first range, C is a function of the radiation received at the detector having energies in a second range where a radiation peak is observed, E is a function of the radiation received at the detector having energies in a third range which is adjacent to that in which the radiation peak is observed, B is a function of the radiation received at the detector having energies in a fourth range where background radiation is observed, $K_1$ and $K_2$ are constants which are used to compensate for the effect of leakage between the source of radiation and the detector and $K_3$ through $K_6$ are constants which are used to relate the known concentration of said samples to said measurement of the X-ray radiation received from said samples.

7. The method of claim 6 wherein the radiation peak observed in said second range is the Compton peak.

8. The method of claim 6 wherein S is the number of photons detected by said detector having energies in said first range, C is the number of photons detected having energies in said second range, E is the number of photons detected having energies in said third range and B is the number of photons detected having energies in said fourth range.

9. The method of claim 1 wherein said calibrating step further comprises the steps of:
measuring the X-ray radiation received at the detector from said samples having energies in a second range where the Compton peak is observed, whereby a plurality of measurements are obtained corresponding to the different samples, said first equation being fitted to said measurements as well;
measuring the X-ray radiation received at the detector from said samples having energies in a third range adjacent to that in which the Compton peak is observed, whereby a plurality of measurements are obtained corresponding to the different samples;
determining the X-ray radiation received from said samples having energies in a fifth range corresponding to the first range but displaced therefrom, the X-ray radiation received having energies in a sixth range corresponding to the second range but displaced therefrom, and the X-ray radiation received having energies in a seventh range corresponding to the third range but displaced therefrom, whereby a plurality of measurements are obtained corresponding to the different samples;
fitting a second equation to the measurements of X-ray radiation in said fifth and sixth ranges, said second equation having the same form as said first equation, said second equation relating the concentration of the samples of known concentration to said measurements of X-ray radiation in said fifth and sixth ranges using at least a second correction factor;
fitting a third equation to said first and second correction factors, said third equation relating the magnitude of said correction factors to at least one of the plurality of measurements made in said first, second and third ranges and the corresponding measurements made in said fifth, sixth and seventh ranges; and
storing said third equation as said function of said first correction factor.

10. The method of claim 9 wherein said first and second equations have the form percent concentration $= A + B \cdot S/C$ where S is the X-ray radiation measured in the first or fifth ranges, C is the X-ray radiation measured in the second or sixth ranges and A and B are correction factors which relate the concentration of the samples of known concentration to said measurements in the first and second, or fifth and sixth ranges, A and B being functions of the ratio of the X-ray radiation received at the detector which has energies in a range within which a known radiation peak is observed to the X-ray radiation received at the detector which has energies in a range adjacent to that within which said known radiation peak is observed.

11. The method of claim 10 wherein the third equation has the form correction factor $= m \cdot E/C + b$ where E is the X-ray radiation measured in the third or seventh ranges, C is the X-ray radiation measured in the second or sixth ranges and m and b are the slope and intercept of a straight line which relates the magnitude of the correction factors to the ratio E/C.

12. The method of claim 1 wherein said steps of irradiating an object having an unknown concentration and measuring the radiation received from said object comprise the steps of:
drilling a borehole through a matrix of material;
inserting into said borehole a probe containing said source of particles or electromagnetic radiation and said detector; and
irradiating said object and measuring the radiation therefrom when said probe is nearby said object.

13. The method of claim 1 wherein said step of irradiating an object having an unknown concentration and measuring the radiation received from said object comprise the steps of:
irradiating a mine face with said source of particles or electromagnetic radiation; and
measuring the radiation from said mine face as a result of said irradiating step.

14. An X-ray fluorescence method for assaying the concentration of a chemical element in an object using a source of particles or electromagnetic radiation having sufficient energy to produce X-ray fluorescence of said element and a detector capable of detecting a spectrum of X-ray fluorescence from said element, said method comprising the steps of:
calibrating the source and detector by:
irradiating with said source a group of samples of different known conbentrations of the element to be assayed;
measuring with said detector the X-ray radiation received at the detector from said samples having energies in a first range which encompasses at least one X-ray fluorescence spectral line associated with said element, whereby a plurality of measurements are obtained corresponding to the different samples; and
fitting an equation to said measurements, said equation relating the concentration of the samples of known concentration to said measurements;
irradiating an object having an unknown concentration of said chemical element with said source of particles or electromagnetic radiation, said source and object having a geometrical relationship that is not necessarily the same as that of the source and samples in said calibrating step;
measuring with said detector the X-ray radiation received from said object having energies in said first range and the radiation received at the detector having energies in said second range, whereby two assay measurements are obtained; and using said first equation to calculate from said assay measurements the concentration of said chemical element in said object.

15. The method of claim 14 wherein the equation that is fitted to said measurements has the general form:

percent concentration = $A + B \cdot S/C$ where S is a function of the X-ray radiation received at the detector from said samples having energies in said first range, C is a function of the X-ray radiation received at the detector having energies in said second range, and A and B are correction factors.

16. The method of claim 15 wherein A and B are functions of the ratio of the X-ray radiation received at the detector which has energies in a range within which a known radiation peak is observed to the X-ray radiation received at the detector which has energies in a range adjacent to that within which said known radiation peak is observed.

17. The method of claim 15 or claim 16 wherein the radiation peak observed in said second range is the Compton peak.

18. The method of claim 14 wherein the radiation peak observed in said second range is the Compton peak.

19. The method of claim 15 or claim 16 or claim 18 wherein:

A is a function having the form:

$A = K_3 + K_4 \cdot E/C$ where E is the X-ray radiation received at the detector which has energies in a range adjacent to that where a known radiation peak is observed, C is the X-ray radiation received at the detector which has energies in said second range and $K_3$ and $K_4$ are constants which adjust said correction factor for changes in the gain of apparatus which performs said measuring steps; and B is a function having the form $B = K_5 + K_6 \cdot E/C$ where E and C are as defined above and $K_5$ and $K_6$ are constants which adjust said correction factor for changes in the gain of the apparatus which performs said measuring steps.

20. An X-ray fluorescence method for assaying the concentration of a chemical element in an object using a source of particles or electromagnetic radiation having sufficient energy to produce X-ray fluorescence of said element and a detector capable of detecting a spectrum of X-ray fluorescence from said element, said method comprising the steps of:

calibrating the source and detector by:
irradiating with said source a group of samples of different known concentrations of the element to be assayed;
counting with said detector the X-ray photons received at the detector from said samples having energies in a first range which encompasses at least one X-ray fluorescence spectral line associated with said element, whereby a plurality of counts are obtained corresponding to the different samples;
fitting a first equation to said counts, said equation relating the concentration of the samples of known concentration to said counts using one or more correction factors; and
storing said correction factors or a function thereof in machine readable form in an electronic processor;
irradiating an object having an unknown concentration of said chemical element with said source of particles or electromagnetic radiation, said source and object having a geometrical relationship that need not be controlled and is not necessarily the same as that of the source and samples in said calibrating step;
counting with said detector the X-ray photons received from said object having energies in said first range, whereby an assay count is obtained; and
using said first equation to calculate from said assay count the concentration of said chemical element in said object.

21. The method of claim 20 wherein the equation that is fitted to said measurements has the form:

percent concentration = $A + B \cdot S$ where S is the number of counts made in said first range and A and B are correction factors.

22. The method of claim 20 wherein the equation that is fitted to said measurements has the general form:

percent concentration = $A + B \cdot S/C$ where S is a function of the counts made in said first range, C is a function of the counts made of X-ray photons received at the detector having energies in a second range in which a radiation peak is observed, and A and B are correction factors.

23. The method of claim 21 or claim 22 wherein A and B are functions of the ratio of the number of counts made of X-ray photons received at the detector which have energies in a third range adjacent that in which the radiation peak is observed to the number of counts made in said second range.

24. The method of claim 21 or claim 22 wherein A and B are functions of the ratio of the number of counts of X-ray photons received at the detector which have energies in a range within which a known radiation peak is observed to the number of counts of X-ray photons received at the detector which have energies in a range adjacent to that within which said known radiation peak is observed.

25. The method of claim 20 wherein the equation that is fitted to said measurements is:

percent concentration =

$$\left( \frac{S - K_1 \cdot B}{C - K_2 \cdot B} \right) \cdot (K_3 + K_4 \cdot E/C) + (K_5 + K_6 \cdot E/C)$$

where S is a function of the number of counts made in said first range, C is a function of the number of counts made of X-ray photons received at the detector having energies in a second range where a radiation peak is observed, E is a function of the number of counts made of X-ray photons received at the detector having energies in a third range adjacent to that in which the radiation peak is observed, B is a function of the number of counts made of X-ray photons received at the detector having energies in a fourth range where background radiation is observed, $K_1$ and $K_2$ are constants which are used to compensate for the effect of leakage between the source of radiation and the detector and $K_3$ through $K_6$ are constants which are used to relate the known concentration of said samples to said counts of the X-ray photons.

26. The method of claim 20 wherein said calibrating step further comprises the steps of:

counting the X-ray photons received at the detector from said samples having energies in a second range where a known radiation peak is observed, whereby a plurality of counts are obtained corresponding to the different samples, and fitting said first equation to said counts as well;

counting the X-ray photons received at the detector from said samples having energies in a third range adjacent to that in which said radiation peak is observed;

determining the X-ray photons received from said samples having energies in a fifth range corresponding to said first range but displaced therefrom, the X-ray photons received having energies in a sixth range corresponding to said second range but displaced therefrom, and the X-ray photons received having energies in a seventh range corresponding to said third range but displaced therefrom, whereby a plurality of counts are obtained corresponding to the different samples;

fitting a second equation to the counts of X-ray radiation so determined in said fifth and sixth ranges, said second equation having the same form as said first equation, said second equation relating the concentration of the samples of known concentration to said counts of X-ray photons in said fifth and sixth ranges using one or more correction factors;

fitting a third equation to said first and second correction factors, said third equation relating the magnitude of said correction factors to at least one of the plurality of counts made in said first, second and third ranges and the corresponding counts made in said fifth, sixth and seventh ranges; and storing said third equation as said function of said correction factors.

27. The method of claim 26 wherein said first and second equations have the form percent concentration $= A + B \cdot S/C$ where S is the counts made in the first or fifth ranges, C is the counts made in the second or sixth ranges and A and B are correction factors which relate the concentration of the samples of known concentration to said counts in the first and second, or fifth and sixth ranges, A and B being functions of the ratio of the number of counts of X-ray photons received at the detector which have energies in a range within which a known radiation peak is observed to the number of counts of X-ray photons received at the detector which have energies in a range adjacent to that within which said known radiation peak is observed.

28. The method of claim 26 wherein the third equation has the form:

correction factor $= m \cdot E/C + b$ where E is the number of counts made in the third or seventh ranges, C is the number of counts made in the second or sixth ranges and m and b are the slope and intercept of a straight line which relates the magnitude of the correction factors to the ratio E/C.

29. The method of claim 20 wherein said steps of irradiating an object having an unknown concentration and counting the X-ray photons received from said object comprise the steps of:

drilling a borehole through a matrix of material;

inserting into said borehole a probe containing said source of particles or electromagnetic radiation and said detector; and irradiating said object and counting the X-ray photons therefrom when said probe is nearby said object.

30. The method of claim 20 wherein said steps of irradiating an object having an unknown concentration and measuring the radiation received from said object comprises the steps of:

irradiating a mineface with said source of particles or electromagnetic radiation; and counting the X-ray photons from said mineface as a result of said irradiating step.

31. An X-ray fluorescence method for assaying the concentration of a chemical element in an object using a source of particles or electromagnetic radiation having sufficient energy to produce X-ray fluorescence of said element and a detector capable of detecting a spectrum of X-ray fluorescence from said element, said method comprising the steps of:

calibrating the source and detector by:

irradiating with said source a group of samples of different known concentrations of the element to be assayed;

measuring with said detector the X-ray radiation received at the detector from said samples having energies in a first range which encompasses at least one X-ray fluorescence spectral line associated with said element and the X-ray radiation received having energies in a second range where a known radiation peak is observed, whereby a plurality of measurements are obtained corresponding to the different samples;

fitting a first equation to said measurements, said equation having the general form:

percent concentration $= A + B \cdot S/C$ where S is the X-ray radiation measured in said first range, C is the X-ray radiation measured in said second range and A and B are correction factors, said first equation relating the concentration of the samples of known concentration to said measurements; and storing said correction factors or a function thereof;

irradiating an object having an unknown concentration of said chemical element with said source of particles or electromagnetic radiation, said source and object having a geometrical relationship that is not necessarily the same as that of the source and samples in said calibrating step;

measuring with said detector the X-ray radiation received from said object having energies in the same range as that in which said X-ray fluorescence spectral line was measured in said calibrating step, whereby an assay measurement is obtained; and using an equation having the same general form as said first equation to calculate from said assay measurement of said stored correction factors or function thereof the concentration of said chemical element in said object.

32. The method of claim 31 wherein A and B are functions of the ratio of the X-ray radiation received at the detector which has energies in a range adjacent to that where a known radiation peak is observed to the X-ray radiation received at the detector having energies in a range where a known radiation peak is observed.

33. The method of claim 31 wherein:
A is a function having the form:

$$A = K_3 + K_4 \cdot E/C$$

where E is the X-ray radiation measured in a range adjacent to that where a known radiation peak is observed, C is the X-ray radiation measured in a range where a known radiation peak is obseved and $K_3$ and $K_4$ are constants which adjust said correction factor for changes in the gain of apparatus which performs said measuring steps; and
B is a function having the form $$B = K_5 + K_6 \cdot E/C$$

where E and C are as defined above and $K_5$ and $K_6$ are constants which adjust said correction factor for changes in the gain of the apparatus which performs said measuring steps.

34. The method of claim 31 further comprising the step of compensating for leakage between the source and the detector by measuring background radiation received at said detector and subtracting from said measurements of X-ray radiation in said first and second ranges a quantity that is a function of the background radiation received at said detector.

35. The method of claim 31 further comprising the steps of:
in the absence of the element to be assayed, measuring the X-ray radiation received at said detector in said first and second ranges and a range where background radiation is observed;
determining from said measurements factors for correcting the measurements in said first and second ranges when an element is being assayed; and
using said correction factors in said steps of calibrating the source and detector and calculating the concentration of the chemical element.

36. The method of any one of the claims 1, 14, 20 and 31 wherein said detector is made of cadmium telluride.

37. A method for performing in situ quantitative analysis of at least one of the elements present in a matrix comprising the steps of:
calibrating a source of particles or electromagnetic radiation having sufficient energy to produce X-ray fluorescence of said element or elements and a detector capable of detecting a spectrum of said X-ray fluorescence by:
irradiating with said source a group of samples of different known concentrations of the element to be assayed;
measuring with said detector the X-ray radiation received at the detector from said samples having energies in a first range which encompasses at least one X-ray fluorescence spectral line associated with said element, whereby a plurality of measurements are obtained corresponding to the different samples;
fitting a first equation to said measurements, said equation relating the concentration of the samples of known concentration to said measurements using at least a first correction factor; and
storing said correction factor(s) or a function thereof;
drilling a borehole into the matrix,
inserting into the borehole said source of particles or electromagnetic radiation and said detector,
irradiating said matrix adjacent said source in said borehole with said particles or electromagnetic radiation,
detecting in said borehole at least a portion of the spectrum of X-ray fluorescence produced by said irradiation, and
using the first equation and said correction factor(s) or a function thereof to analyze the detected spectrum so as to develop therefrom a quantitative estimate of the concentration of at least one said element present in said matrix.

38. The method of claim 37 wherein the equation that is fitted to said measurements in said calibrating step has the form:

$$\text{percent concentration} = A + B \cdot S$$

where S is a function of the X-ray radiation received at the detector from said samples having energies in said first range, and A and B are correction factors.

39. The method of claim 37 wherein the equation that is fitted to said measurements in said calibrating step has the general form:

$$\text{percent concentration} = A + B \cdot S/C$$

where S is a function of the X-ray radiation received at the detector from said samples having energies in said first range, C is a function of the X-ray radiation received at the detector having energies in a second range where the Compton peak is observed, and A and B are correction factors.

40. The method of claim 38 or claim 39 wherein A and B are functions of the ratio of the X-ray radiation received at the detector which has energies in a third range adjacent that in which the Compton peak is observed to the X-ray radiation received at the detector having energies in said second range.

41. The method of claim 38 or claim 39 wherein A and B are functions of the ratio of the X-ray radiation received at the detector which has energies in a range within which a known radiation peak is observed to the X-ray radiation received at the detector which has energies in a range adjacent to that within which said known radiation peak is observed.

42. The method of claim 37 wherein the equation that is fitted to said measurements in said calibrating step is:

$$\text{percent concentration} = \left( \frac{S - K_1 \cdot B}{C - K_2 \cdot B} \right) \cdot (K_3 + K_4 \cdot E/C) + (K_5 + K_6 \cdot E/C)$$

where S is a function of the X-ray radiation received at the detector from said samples having energies in said first range, C is a function of the radiation received at the detector having energies in a second range where a radiation peak is observed, E is a function of the radiation received at the detector having energies in a third range which is adjacent to that in which the radiation peak is observed, B is a function of the radiation received at the detector having energies in a fourth range where background radiation is observed, $K_1$ and $K_2$ are constants which are used to compensate for the effect of leakage between the source of radiation and the detector and $K_3$ through $K_6$ are constants which are used to relate the known concentration of said samples to said measurement of the X-ray radiation received from said samples.

43. The method of claim 37 wherein the radiation peak observed in said second range is the Compton peak.

44. The method of claim 37 wherein S is the number of photons detected by said detector having energies in said first range, C is the number of photons detected having energies in said second range, E is the number of photons detected having energies in said third range and B is the number of photons detected having energies in said fourth range.

45. The method of claim 37 wherein said calibrating step further comprises the steps of:
   measuring the X-ray radiation received at the detector from said samples having energies in a second range where the Compton peak is observed, whereby a plurality of measurements are obtained corresponding to the different samples, said first equation being fitted to said measurements as well;
   measuring the X-ray radiation received at the detector from said samples having energies in a third range adjacent to that in which the Compton peak is observed, whereby a plurality of measurements are obtained corresponding to the different samples;
   determining the X-ray radiation received from said samples having energies in a fifth range corresponding to the first range but displaced therefrom, the X-ray radiation received having energies in a sixth range corresponding to the second range but displaced therefrom, and the X-ray radiation received having energies in a seventh range corresponding to the third range but displaced therefrom, whereby a plurality of measurements are obtained corresponding to the different samples;
   fitting a second equation to the measurements of X-ray radiation in said fifth and sixth ranges, said second equation having the same form as said first equation, said second equation relating the concentration of the samples of known concentration to said measurements of X-ray radiation in said fifth and six ranges using at least a second correction factor;
   fitting a third equation to said first and second correction factors which relates the magnitude of said correction factors to at least one of the measurements made in said first, second and third ranges and the corresponding measurement(s) made in said fifth, sixth and seventh ranges; and
   storing said third equation as said function of said first correction factor(s).

46. The method of claim 45 wherein said first and second equations have the form percent concentration $= A + B \cdot S/C$ where S is the X-ray radiation measured in the first or fifth ranges, C is the X-ray radiation measured in the second or sixth ranges and A and B are correction factors which relate the concentration of the samples of known concentration to said measurements in the first and second, or fifth and sixth ranges, A and B being functions of the ratio of the X-ray radiation received at the detector which has energies in a range within which a known radiation peak is observed to the X-ray radiation received at the detector which has energies in a range adjacent to that within which said known radiation peak is observed.

47. The method of claim 45 or claim 46 wherein the third equation has the form correction factor $= m \cdot E/C + b$ where E is the X-ray radiation measured in the third or seventh ranges, C is the X-ray radiation measured in the second or sixth ranges and m and b are the slope and intercept of a straight line which relates the magnitude of the correction factors to the ratio E/C.

48. The method of claim 46 wherein:
   A is a function having the form:

$A = K_3 + K_4 \cdot E/C$ where E is the X-ray radiation measured in a range adjacent to that where a known radiation peak is observed, C is the X-ray radiation measured in a range where a known radiation peak is obseved and $K_3$ and $K_4$ are constants which adjust said correction factor for changes in the gain of apparatus which performs said measuring steps; and
   B is a function having the form $B = K_5 + K_6 \cdot E/C$ where E and C are as defined above and $K_5$ and $K_6$ are constants which adjust said correction factor for changes in the gain of the apparatus which performs said measuring steps.

49. In an X-ray fluorescence method for assaying the concentration of a chemical element in an object using a source of particles or electromagnetic radiation having sufficient energy to produce X-ray fluorescence of said element, a detector capable of detecting a spectrum of X-ray fluorescence from said element and electronic means for generating signals having magnitudes that are a function of the energy of the X-ray fluorescence detected, a method of compensating for changes in the gain of said electronic means that alter the magnitude of the signal generated by said electronic means, said method comprising the steps of:
   (a) irradiating with said source a group of samples of different known concentrations of the element to be assayed;
   (b) measuring with said detector the X-ray radiation received at the detector from said samples having energies in a first range which encompasses at least one X-ray fluorescence spectral line associated with said element, the radiation received at the detector having energies in a second range within which a known radiation peak is observed, and the X-ray radiation received at the detector having energies in a third range which is adjacent to said second range, whereby three sets of measurements are obtained corresponding to the different samples;

(c) fitting a first equation to said measurements in at least said first and second ranges, said first equation relating the concentration of the samples of known concentration to said measurements;

(d) determining the X-ray radiation received by said detector having energies in a fifth range corresponding to the first range but displaced therefrom, the X-ray radiation received having energies in a sixth range corresponding to the second range but displaced therefrom, and the X-ray radiation received having energies in a seventh range corresponding to the third range but displaced therefrom, whereby three sets of measurements are obtained corresponding to the different samples;

(e) fitting a second equation to said measurements of X-ray radiation in at least said fifth and sixth ranges, said second equation having the same form as that of said first equation and relating the concentration of the samples of known concentration to said measurements;

(f) fitting a third equation to said first and second correction factors which relates the magnitude of said correction factors to at least one of the three sets of measurements made in step (b) and the corresponding measurements made in step (d);

(g) storing said third equation;

(h) irradiating an object having an unknown concentration of said chemical element with said source of particles or electromagnetic radiation;

(i) measuring with said detector the X-ray radiation received from said unknown material having energies in a ninth range corresponding to the first range, a tenth range corresponding to the second range, and an eleventh range corresponding to the third range, whereby three assay measurements are obtained;

(j) using said third equation to determine the magnitude of a third correction factor using the measurement(s) made in step (i) that correspond to those used in fitting said third equation; and (k) using an equation of the same general form as said first equation to calculate from at least some of said measurements made in step (i) and said third correction factor the concentration of said chemical element in said object.

50. The method of claim 49 wherein said first and second equations have the general form:

$$\text{percent concentration} = A + B \cdot S/C$$

where S is the X-ray radiation measured in said first or fifth ranges, C is the X-ray radiation measured in said second or sixth ranges and A and B are correction factors which relate the concentration of the samples of known concentration to said measurements.

51. The method of claim 50 wherein A and B are functions of the ratio of the X-ray radiation received at the detector which has energies in a range adjacent to that where a known radiation peak is observed to the X-ray radiation received at the detector having energies in a range where a known radiation peak is observed.

52. The method of claim 50 wherein:
A is a function having the form:

$$A = K_3 + K_4 \cdot E/C$$

where E is the X-ray radiation measured in a range adjacent to that where a known radiation peak is observed, C is the X-ray radiation measured in a range where a known radiation peak is obseved and $K_3$ and $K_4$ are constants which adjust said correction factor for changes in the gain of apparatus which performs said measuring steps; and B is a function having the form $$B = K_5 + K_6 \cdot E/C$$

where E and C are as defined above and $K_5$ and $K_6$ are constants which adjust said correction factor for changes in the gain of the apparatus which performs said measuring steps.

53. In an X-ray fluorescence method for assaying the concentration of the chemical element in an object using a source of particles or electromagnetic radiation having sufficient energy to produce X-ray fluorescence of said element, a detector capable of detecting a spectrum of X-ray fluorescence from said element and electronic means for generating signals having magnitudes that are a function of the energy of the X-ray fluorescence detected, a method of compensating for changes in the gain of said electronic means that alter the magnitude of the signal generated by said electronic means, said method comprising the steps of:

(a) irradiating with said source a group of samples of different known concentrations of the element to be assayed;

(b) measuring with said detector the X-ray radiation received at the detector from said samples having energies in a first range which encompasses at least one X-ray fluorescence spectral line associated with said element, the radiation received at the detector having energies in a second range within which a known radiation peak is observed, and the X-ray radiation received at the detector having energies in a third range which is adjacent to said second range, whereby three sets of measurements are obtained corresponding to the different samples;

(c) fitting to said measurements a first equation having the form:

$$\text{percent concentration} = A + B \cdot S/C$$

where S is a function of the X-ray radiation received at the detector from said samples having energies in said first range, C is a function of the X-ray radiation received at the detector having energies in said second range, and A and B are correction factors;

(d) determining the X-ray radiation received by said detector having energies in a fifth range corresponding to the first range but displaced therefrom, the X-ray radiation received having energies in a sixth range corresponding to the second range but displaced therefrom, and the X-ray radiation received having energies in a seventh range corresponding to the third range but displaced therefrom, whereby three sets of measurements are obtained corresponding to the different samples;

(e) fitting a second equation to said measurements of X-ray radiation in at least said fifth and sixth ranges, said second equation having the same form as that of said first equation;

(f) fitting a third equation to at least said A correction factors which relates the magnitude of said correction factors to at least one of the three sets of measurements made in step (b) and the corresponding measurements made in step (d);

(g) fitting a fourth equation to at least said B correction factors which relates the magnitude of said correction factors to at least one of the three sets of measurements made in step (b) and the corresponding measurement(s) made in step (d);

(h) storing said third and fourth equations;

(i) irradiating an object having an unknown concentration of said chemical element with said source of particles or electromagnetic radiation;

(j) measuring with said detector the X-ray radiation received from said unknown material having energies in a ninth range corresponding to the first range, a tenth range corresponding to the second range, and an eleventh range corresponding to the third range, whereby three assay measurements are obtained;

(k) using said third equation to determine the magnitude of a third correction factor using the measurement(s) made in step (j) that correspond to those used in fitting said third equation;

(l) using said fourth equation to determine the magnitude of a fourth correction factor using the measurement(s) made in step (j) that correspond to those used in fitting said fourth equation; and (m) using an equation of the same general form as said first equation to calculate from at least some of said measurements made in step (i) and said third and fourth correction factors the concentration of said chemical element in said object.

54. The method of claim 53 wherein A and B are functions of the ratio of the X-ray radiation received at the detector which has energies in a range adjacent to that where a known radiation peak is observed to the X-ray radiation received at the detector having energies in a range where a known radiation peak is observed.

55. The method of claim 53 wherein:
A is a function having the form:

$$A = K_3 + K_4 \cdot E/C$$

where E is the X-ray radiation measured in a range adjacent to that where a known radiation peak is observed, C is the X-ray radiation measured in a range where a known radiation peak is observed and $K_3$ and $K_4$ are constants which adjust said correction factor for changes in the gain of apparatus which performs said measuring steps; and
B is a function having the form $$B = K_5 + K_6 \cdot E/C$$

where E and C are as defined above and $K_5$ and $K_6$ are constants which adjust said correction factor for changes in the gain of the apparatus which performs said measuring steps.

56. An X-ray fluorescence method for assaying the concentration of a chemical element in an object using a source of particles or electromagnetic radiation having sufficient energy to produce X-ray fluorescence of said element and a detector capable of detecting a spectrum of X-ray fluorescence from said element, said method comprising the steps of:
calibrating the source and detector by:
 irradiating with said source a group of samples of different known concentrations of the element to be assayed;
 measuring with said detector the X-ray radiation received at the detector from said samples having energies in a first range which encompasses at least one X-ray fluorescence spectral line associated with said element, whereby a plurality of measurements are obtained corresponding to the different samples;
 fitting a first equation to said measurements, said equation relating the concentration of the samples of known concentration to said measurements using at least a first correction factor;
 storing said correction factor or a function thereof;
irradiating a rough surfaced object having an unknown concentration of said chemical element with said source of particles or electromagentic radiation, said source and object having a geometrical relationship that need not be controlled;
measuring with said detector the X-ray radiation received from said object having energies in the same range as that in which said X-ray fluorescence spectral line was measured in said calibrating step, whereby an assay measurement is obtained; and
using an equation of the same general form as said first equation to calculate from said assay measurement and said stored correction factor or function thereof the concentration of said chemical element in said object.

57. An X-ray fluorescence method for assaying the concentration of a chemical element in an object using a source of particles or electromagnetic radiation having sufficient energy to produce X-ray fluorescence of said element and a detector capable of detecting a spectrum of X-ray fluorescence from said element, said method comprising the steps of:
calibrating the source and detector by:
 irradiating with said source a group of samples of different known concentrations of the element to be assayed;
 measuring with said detector the X-ray radiation received at the detector from said samples having energies in a first range which encompasses at least one X-ray fluorescence spectral line associated with said element, whereby a plurality of measurements are obtained corresponding to the different samples;
 fitting a first equation to said measurements, said equation relating the concentration of the samples of known concentration to said measurements using at least a first correction factor; and
 storing said correction factor or a function thereof;
irradiating in situ an object having an unknown concentration of said chemical element with said source of particles or electromagnetic radiation, said source and object having a geometrical relationship that need not be controlled;
measuring with said detector the X-ray radiation received from said object having energies in the same range as that in which said X-ray fluorescence spectral line was measured in said calibrating step, whereby an assay measurement is obtained; and
using an equation of the same general form as said first equation to calculate from said assay measurement and said stored correction factor or a function thereof the concentration of said chemical element in said object.

58. An X-ray fluorescence method for assaying the concentration of a chemical element in an object using a source of particles or electromagnetic radiation having sufficient energy to produce X-ray fluorescence of said element and a detector capable of detecting a spectrum of X-ray fluorescence from said element, said method comprising the steps of:

calibrating the source and detector by:
  irradiating with said source a group of samples of different known concentrations of the element to be assayed;
  measuring with said detector the X-ray radiation received at the detector from said samples having energies in a first range which encompasses at least one X-ray fluorescence spectral line associated with said element, whereby a plurality of measurements are obtained corresponding to the different samples;
  fitting a first equation to said measurements, said equation relating the concentration of the samples of known concentration to said measurements using at least a first correction factor; and
  storing said correction factor or a function thereof;
irradiating in a borehole an object having a unknown concentration of said chemical element with said source of particles or electromagnetic radiation without prior preparation of said object for irradiation;
measuring with said detector the X-ray radiation received from said object having energies in the same range as that in which said X-ray fluorescence spectral line was measured in said calibrating step, whereby an assay measurement is obtained; and
using an equation of the same general form as said first equation to calculate from said assay measurement and said stored correction factor or a function thereof the concentration of said chemical element in said object.

* * * * *